(12) United States Patent
Mirra et al.

(10) Patent No.: US 9,015,073 B2
(45) Date of Patent: *Apr. 21, 2015

(54) CONTROLLED CREATION OF REPORTS FROM TABLE VIEWS

(71) Applicant: Addepar, Inc., Mountain View, CA (US)

(72) Inventors: Jason Mirra, Mountain View, CA (US); Michael Paulus, Menlo Park, CA (US); Wai Loon Chan, Mountain View, CA (US); Richard Thomas Martell, III, Los Altos, CA (US); Justin D. Ross, San Francisco, CA (US); Michael Lee Greenbaum, Mountain View, CA (US)

(73) Assignee: Addepar, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,855

(22) Filed: Oct. 8, 2012

(65) Prior Publication Data

US 2013/0332862 A1    Dec. 12, 2013

Related U.S. Application Data

(63) Continuation of application No. 13/490,238, filed on Jun. 6, 2012.

(51) Int. Cl.
*G06Q 40/00* (2012.01)
*G06Q 40/06* (2012.01)
(Continued)

(52) U.S. Cl.
CPC ............... *G06Q 40/06* (2013.01); *G06F 3/048* (2013.01); *G06K 9/6296* (2013.01);
(Continued)

(58) Field of Classification Search
CPC ....... G06Q 40/06; G06Q 40/00; G06Q 40/08; G06F 3/048; G06F 11/323; G06T 15/005; G06K 9/6296
USPC .................................. 705/36, 36 R; 715/760
See application file for complete search history.

(56) References Cited

U.S. PATENT DOCUMENTS 6,865,567 B1 *   3/2005   Oommen et al. ...................... 1/1
7,046,248 B1 *   5/2006   Perttunen ....................... 345/440

(Continued)

FOREIGN PATENT DOCUMENTS

EP    2439691 A1    4/2012
EP    2672446       12/2013

(Continued)

OTHER PUBLICATIONS

Chakrabarti, D., & Faloutsos, C. (2006). Graph mining. ACM Computing Surveys, 38(1), 2. doi:http://doi.acm.org/10.1145/1132952.1132954 retrieved on Feb. 6, 2015.*

(Continued)

*Primary Examiner* — Kito R Robinson
(74) *Attorney, Agent, or Firm* — Knobbe, Martens, Olson & Bear LLP

(57) ABSTRACT

A method comprising creating and storing, in memory of a computer, a graph having nodes and edges, wherein the nodes represent financial assets and any one or more of: accounts in which one or more of the assets are held; individuals who own one or more of the assets; or legal entities who own one or more of the assets; receiving and storing one or more bucketing factors and one or more column factors; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; creating and causing displaying a table view by forming rows based on the value nodes and forming columns based on the column result values.

19 Claims, 21 Drawing Sheets

(51) Int. Cl.
*G06F 3/048* (2013.01)
*G06F 3/0481* (2013.01)
*G06K 9/62* (2006.01)
*G06T 15/00* (2011.01)
*G06F 11/32* (2006.01)
*G06Q 40/08* (2012.01)

(52) U.S. Cl.
CPC ............ *G06T 15/005* (2013.01); *G06F 11/323* (2013.01); *G06Q 40/08* (2013.01); *G06Q 40/00* (2013.01); *G06F 3/0481* (2013.01)

(56) References Cited

U.S. PATENT DOCUMENTS

| | | | |
|---|---|---|---|
| 7,395,270 B2 * | 7/2008 | Lim et al. ............................... | 1/1 |
| 7,533,057 B2 * | 5/2009 | Whipple et al. ................ | 705/38 |
| 7,644,088 B2 | 1/2010 | Fawcett et al. | |
| 7,769,682 B2 * | 8/2010 | Moudgal ........................ | 705/38 |
| 7,827,082 B1 | 11/2010 | Shanmugam | |
| 7,836,394 B2 * | 11/2010 | Linder ........................... | 715/234 |
| 7,873,557 B2 | 1/2011 | Guidotti et al. | |
| 7,966,234 B1 | 6/2011 | Merves et al. | |
| 7,996,234 B2 | 8/2011 | Dieterich et al. | |
| 7,996,290 B2 | 8/2011 | Dweck et al. | |
| 8,249,962 B1 * | 8/2012 | Stephens et al. ................ | 705/35 |
| 8,306,891 B1 | 11/2012 | Findlay, III et al. | |
| 2002/0042764 A1 | 4/2002 | Gardner et al. | |
| 2004/0236655 A1 | 11/2004 | Scumniotales et al. | |
| 2005/0187852 A1 | 8/2005 | Hwang | |
| 2005/0222929 A1 * | 10/2005 | Steier et al. .................... | 705/35 |
| 2006/0146719 A1 * | 7/2006 | Sobek et al. ................... | 370/238 |
| 2007/0011071 A1 * | 1/2007 | Cuscovitch et al. ............ | 705/35 |
| 2008/0139191 A1 * | 6/2008 | Melnyk et al. ................ | 455/419 |
| 2008/0270316 A1 | 10/2008 | Guidotti et al. | |
| 2009/0164387 A1 | 6/2009 | Armstrong et al. | |
| 2009/0249359 A1 * | 10/2009 | Caunter et al. ................ | 719/315 |
| 2012/0136804 A1 | 5/2012 | Lucia et al. | |
| 2012/0182882 A1 * | 7/2012 | Chrapko et al. .............. | 370/248 |
| 2013/0212505 A1 | 8/2013 | Herold | |
| 2013/0332387 A1 | 12/2013 | Mirra et al. | |

FOREIGN PATENT DOCUMENTS

| | | |
|---|---|---|
| EP | 2672447 | 12/2013 |
| EP | 2743881 | 6/2014 |
| HK | 1193898 | 10/2014 |
| JP | 2002197277 A | 7/2002 |
| SG | 195517 | 12/2013 |
| SG | 195518 | 12/2013 |
| WO | WO 2005/036364 A2 | 4/2005 |

OTHER PUBLICATIONS

Intellectual Property Office of Singapore, "Search and Examination Report" in application No. 201304379-9, dated Jan. 23, 2014, 14 pages.

European Patent Office, "Search Report" in application No. 13170954.5-1958, dated Jan. 21, 2014, 6 pages.

Current Claims in applicationn No. 201304379-9, dated Jan. 2014, 5 pages.

Current Claims in application No. 13170954.5-1958, dated Jan. 2014, 5 pages.

European Patent Office, "Search Report" in application No. 13170952.9, dated Jan. 21, 2014, 6 pages.

Singapore, "Search and Examination Report" in application No. 201304378-1, dated Jul. 3, 2014.

European Patent Office, "Search Report" in application No. 13197286.1, dated Mar. 14, 2014, 5 pages.

* cited by examiner

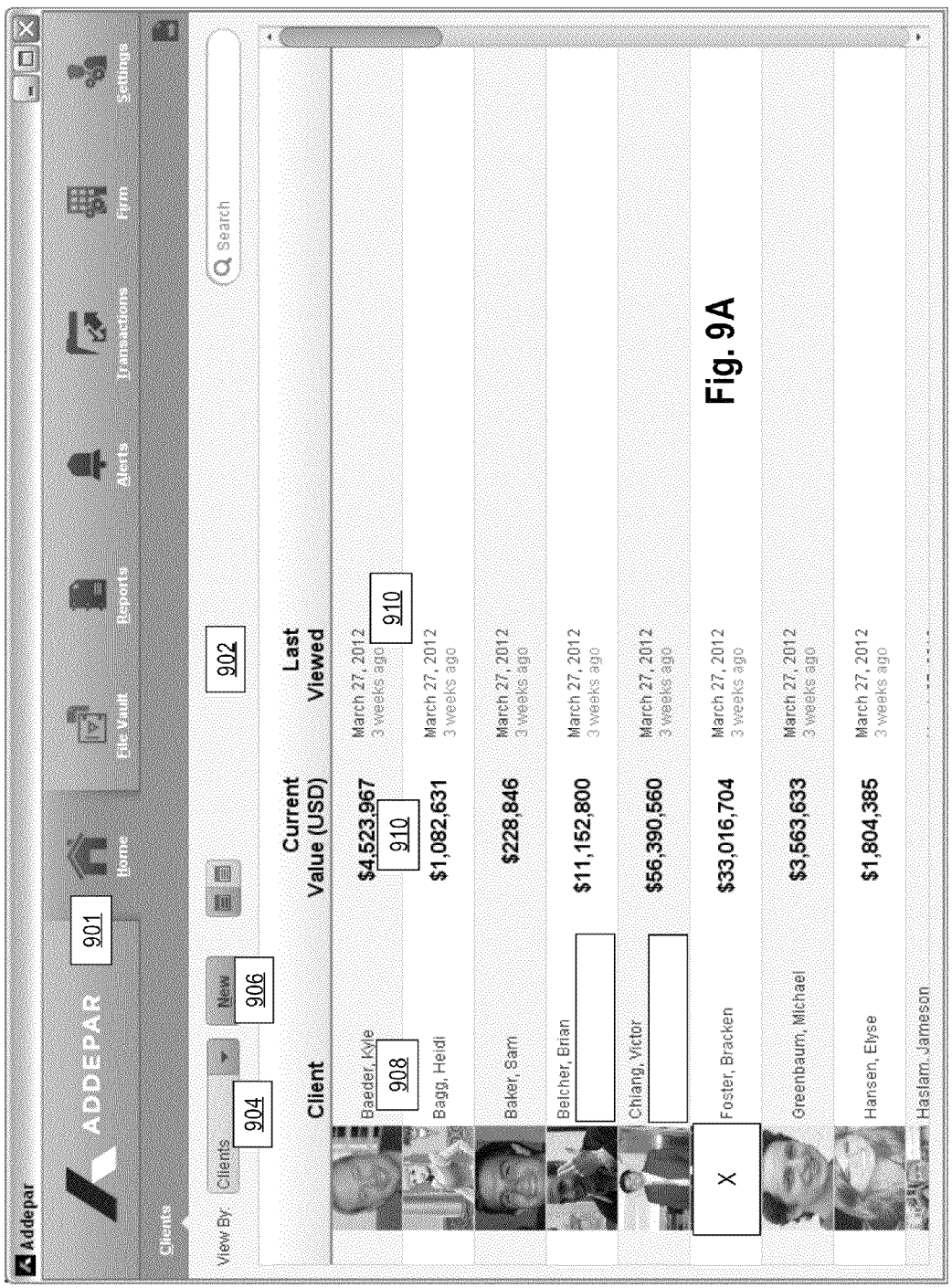

Edit Column Properties   1702

| Column | Name | Format   1708 |
|---|---|---|
| Asset Class | Asset Class | |
| Current Value (USD) | Current Value (USD) | Default Format |
| 1 Mo. Adjusted IRR | 1 Mo. Adjusted IRR | Default Format |
| 3 Mo. Adjusted IRR | 3 Mo. Adjusted IRR | Default Format |
| Adjusted IRR YTD | Adjusted IRR YTD | Default Format |
| Adjusted IRR Since Inception | Adjusted IRR Since Inception | Default Format |

1704                1706

1710
982.17%
982.17
982.16999999999%
982.16999999999
982.2%
982
982.2%

Finished   Cancel

Fig. 17

CONTROLLED CREATION OF REPORTS FROM TABLE VIEWS

CROSS-REFERENCE TO RELATED APPLICATIONS; BENEFIT CLAIM

This application claims the benefit under 35 U.S.C. §120 as a Continuation of application Ser. No. 13/490,238, filed Jun. 6, 2012, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates to data processing, particularly techniques for generating reports from table-oriented displays of data from a data repository based on complex data structures.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Financial advisors, such as registered investment advisors (RIAs) and their firms, often need to view data relating to investment holdings of clients for purposes of analysis, reporting, sharing, or recommendations. Client investments may be held by individuals, partnerships, trusts, companies, and other legal entities having complex legal or ownership relationships. RIAs and other users want to view complex holdings in a flexible way, for example, by selecting different metrics and/or defining their own views and reports on-the-fly.

However, current wealth management technology does not offer the capability to generate views, reports, or other displays of data from complex investment holding structures in a flexible, shareable, efficient way. Some existing wealth management systems are custom-built and therefore relatively static in their viewing capabilities, requiring programmers for customization. Other systems lack scalability and are time-consuming to use. A third type of system consists of MICROSOFT VISUAL BASIC scripts written for use with MICROSOFT EXCEL spreadsheets; this type of system is an awkward attempt to add some measure of flexibility to an otherwise static foundation.

SUMMARY

The appended claims may serve as a summary of the invention.

BRIEF DESCRIPTION OF THE DRAWINGS

In the drawings:

FIG. 2

FIG. 9A illustrates a home screen display illustrating a portfolio summary view from the Perspective of Clients.

FIG. 13 illustrates the display of FIG. 4 showing asset details.

FIG. 15 illustrates an example of a report creation user interface as seen immediately after initiation of operation.

FIG. 17 illustrates an example of a column editing dialog.

DETAILED DESCRIPTION OF EXAMPLE EMBODIMENTS

Figure 1:
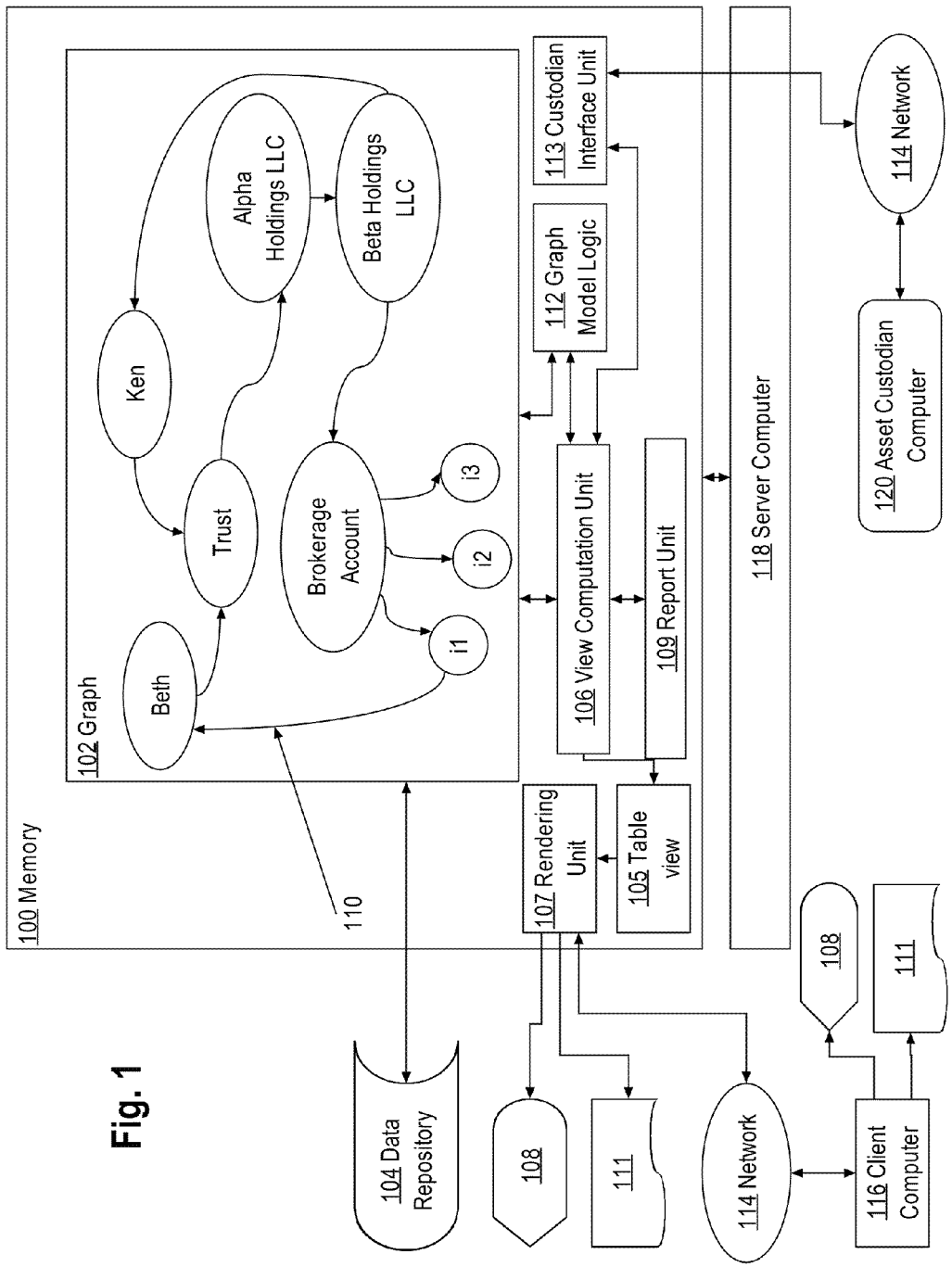
FIG. 1 illustrates a computer system that may be used to implement an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

In an embodiment, a data processing method comprises creating and storing, in memory of a computer, a graph having nodes and edges, wherein the nodes represent financial assets and any one or more of: accounts in which one or more of the assets are held; individuals who own one or more of the assets; or legal entities who own one or more of the assets; receiving and storing one or more bucketing factors and one or more column factors; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; creating and causing displaying a table view by forming rows based on the value nodes and forming columns based on the column result values.

In an embodiment, a method comprises creating and storing, in memory of a computer, a graph having nodes and edges, wherein the nodes represent financial assets and any one or more of: accounts in which one or more of the assets are held; individuals who own one or more of the assets; or legal entities who own one or more of the assets; receiving and storing one or more bucketing factors and one or more column factors; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; creating and causing displaying a table view by forming rows based on the value nodes and forming columns based on the column result values.

In an embodiment, the method further comprises, for the bucketing factors, selecting a particular bucketing factor; applying the particular bucketing factor to the paths and receiving a bucketing result value; creating a value node for the result value; associating, with the value node, all child nodes of the paths having bucketing result values that match the value node.

In an embodiment, the method further comprises, for the column factors, for the value nodes, and for paths associated with a particular value node, applying a particular column factor to a particular path and receiving a column result value; associating the column result value with the particular value node. In one feature, the edges represent any one or more of: ownership; containment; or data flow. In another feature at least two of the edges comprise a circular reference from a particular node to that particular node; further comprising determining, during the traversing, whether two sequences of two or more traversed nodes are identical, and if so, backtracking the traversal and moving to a next adjacency. In yet another feature one or more of the bucketing factors or column factors comprises an executable code segment configured to perform one or more mathematical calculations using one or more attributes of nodes in a path.

In still another feature one or more of the bucketing factors or column factors comprises an executable code segment configured to invoke a function of a network resource using one or more attributes of nodes in a path.

In an embodiment, the method further comprises generating and causing display of a graphical user interface comprising the table view and one or more info-graphics, wherein each of the info-graphics is programmatically coupled to the table view using one or more data relationships, and further comprising receiving user input selecting one or more rows of the table view and, in response, automatically updating the info-graphics to display only graphical representations of the one or more rows of the table view that are in the user input.

In an embodiment, the method further comprises generating and causing display of a graphical user interface comprising the table view; causing displaying a bucketing factor menu identifying one or more available bucketing factors; receiving a selection of a particular bucketing factor; re-traversing the graph and applying the particular bucketing factor to the paths to result in associating second sets of the nodes with second value nodes among the plurality of value nodes; re-creating and causing re-displaying an updated table view based on the second value nodes and the column result values.

In an embodiment, the method further comprises generating and causing display of a graphical user interface comprising the table view; causing displaying a column factor menu identifying one or more available column factors; receiving a selection of a particular column factor; re-traversing the graph and applying the particular column factor to the paths and the value nodes to result in associating second column result values with the value nodes; re-creating and causing re-displaying an updated table view based on the value nodes and the second column result values.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a particular one of the graphical elements; creating and storing a filter that is configured to pass only data in the table view that corresponds to the particular one of the graphical elements; applying the filter to the table view and causing re-displaying the table view using only data in the table view that corresponds to the particular one of the graphical elements.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a one or more particular rows in the table view; updating the info-graphics by causing displaying graphical elements corresponding only to the particular rows in the table view.

In an embodiment, the method further comprises generating and causing display of a graphical user interface comprising the table view and one or more info-graphics; receiving a selection of one row associated with an asset; updating the graphical user interface to display a summary of attributes of the asset, based on stored asset data or based on retrieving, at the time of the selection, the attributes of the asset from one or more global data sources.

In an embodiment, the method further comprises displaying, with the summary of attributes of the asset, a transaction reference identifying a number of transactions previously completed by a particular perspective.

In an embodiment, the method further comprises receiving and storing a context comprising a perspective and a date, wherein the perspective identifies any of an individual, a group, and a legal entity; beginning the traversing at a first node associated with the perspective; receiving user input specifying a different perspective; repeating the traversing beginning at a second node associated with the different perspective and repeating the creating and causing displaying the table view, based on updated value nodes and updated column result values yielded from the different perspective.

In an embodiment, the method further comprises receiving an updated context comprising a changed date value; repeating the traversing, creating and causing displaying the table view based on updated value nodes and updated column result values yielded from re-applying the column factors using the changed date value.

2.0 Structural and Functional Overview

In an embodiment, a computer system provides wealth management capabilities that enable non-technical users to create new views, reports, and other manipulations of a dataset without the need for custom programming. Custom views can be created in any user session by selecting particular columns, factors or metrics, ordering, filters providing groupings, graphics and other aspects of a desired view. The resulting views can be saved and reused in later sessions. However, a view that is needed only on a one-time basis also may be constructed rapidly using atomic components without specialized programming knowledge. Further, views may be shared with others such as team members, clients, or other applications. Sharing may include exporting to an application such as a spreadsheet, transferring to a report generator, or other mechanisms as further described herein.

FIG. 1 illustrates a computer system that may be used to implement an embodiment. In an embodiment, computer memory 100 stores a graph 102 that represents a set of investment holdings. In an embodiment, client or customer investment data is received from one or more sources, such as brokerages, and transformed into position data prior to storage into a data repository for use by the system. Positions, in an embodiment, are considered the most fine-grained or atomic element of data manipulated in the system rather than, for example, an account.

Memory 100 forms part of a computer system having a processor, mass storage, input-output devices, and other elements that are omitted in FIG. 1 for purposes of clarity. A view computation unit 106 can access the graph 102 for purposes of traversing the graph in response to different configuration data and generating output one or more table views 105 in the manner described further herein. View computation unit 106 may be coupled to a rendering unit 107 for rendering and communicating table views 105 to any of a computer display unit 108 or an electronic document 111 of any form such as a report, spreadsheet file, etc. In an embodiment, report unit 109 is configured to receive view data from view computation unit 106, facilitate transfer of view data to pages of reports, and receive user input specifying metadata for report formatting controls, as further described herein.

In an embodiment, view computation unit 106 and graph 102 are implemented using object-oriented programming techniques in which nodes of the graph are represented using programmatic objects. For example, JAVA® may be used.

In an embodiment, the foregoing elements of FIG. 1 form part of a server computer 118 that is coupled directly or indirectly through one or more computer networks, represented by network 114, to a client computer 116. Network 114 may comprise one or more LAN, WAN, or internetwork links and may comprise the public internet through the use of appropriate protocols for ensuring data security, user authentication and user authorization. Client computer 116 may comprise an individual client computing device such as personal computer, workstation, laptop, netbook, tablet computer, or smartphone that is coupled through a computer network to the other elements of FIG. 1. Client computer 116 hosts an internet browser program which, in an embodiment, is configured with virtual machine program execution capability. For example, client computer 116 may host a JAVA virtual machine and may receive and execute one or more JAVA files that cause the browser to display a graphical user interface that receives data from and facilitates interaction with the server computer 118 and view computation unit 106.

View computation unit 106 also may be coupled to a custodian interface unit 113 that is coupled directly or indirectly through network 114 to an asset custodian computer 120. In an embodiment, asset custodian computer 120 serves as an authoritative source of data about accounts and asset positions associated with individuals or other entities represented in data repository 104 and graph 102. Custodian interface unit 113 is configured to obtain account and position snapshot data periodically or through live data feeds from asset custodian computer 120. Inbound data may be transformed from account-level data into position-level data and stored in data repository 104 or represented in graph 102 in memory for further reference and manipulation.

Embodiments may also interface in a similar manner to global data sources such as market data feeds that are independent of particular accounts or positions but report current or historic market value of assets or instruments. Examples of sources of global data include Thomson Reuters, New York Stock Exchange, NASDAQ, etc. In such an embodiment, global data sources may or may not override asset values that are stored in the graph, based on configuration data. For example, a particular node of graph 102 representing an asset may store an asset value attribute that was obtained from positions data derived from account data obtained from an asset custodian. However, if the asset is, for example, a market traded security, then a current intraday value for the asset may be available from the global data source. Configuration data may indicate whether global data source values for assets should override position data obtained from a custodian or other sources.

A set of investment holdings may be associated with an individual, a legal entity, or a group of individuals and/or legal entities such as one or more clients of an RIA firm. Graph 102 may be formed in memory 100 based on data records obtained from data repository 104. Graph 102 may comprise any number of nodes and edges, and the particular graph shown in FIG. 1 is provided solely to illustrate one clear example and not as a requirement or limitation.

Graph 102 may comprise nodes and edges having any level of complexity, and there is no requirement that nodes are organized in a hierarchical arrangement; circular references may be represented. As an example, graph 102 comprises nodes for individuals named Beth and Ken who have an ownership or trusteeship relationship to a Trust. The Trust is related to a company, Alpha Holdings LLC, which is also related to a second company, Beta Holdings LLC that may own a Brokerage Account having instruments i1, i2, i3. Instruments i1, i2, i3 may represent stocks, bonds, options, or any other financial instrument that may be traded or receive an investment; for purposes of illustrating a clear example, three (3) instruments are shown in FIG. 1 but practical embodiments may use any number of instruments. Beta Holdings LLC further has a relationship to Ken and instrument i1 has a relationship to Beth; these relationships circle back within the graph and provide examples of non-hierarchical node-edge relationships. For example, one circular reference is the path Ken→Trust→Alpha Holdings LLC→Beta Holdings LLC→Ken.

Edge 110 may represent a flow of instrument data from a third party data source such as a brokerage data feed. For example, edge 110 could represent a brokerage data feed for instrument i1 indicating that Beth owns 200 units, such as shares, having a value of 25 per unit. Edge 110 may also represent an ownership relationship separate from value attributes. Edge 110 or other edges may represent other concepts such as issuance of an asset; thus, one node may represent an issuer of an asset, another node may represent the asset, and an edge connecting the two nodes may represent that the first node issued the second node.

Graph nodes may receive data for attributes of the nodes from a custodian, from a global data source, or from other data in the data repository. For example, processing a particular client's custodial account may enable populating the graph 102 with some, but not all, values of attributes that are defined in the graph model. In an embodiment, view computation unit 106 is configured to investigate alternative data sources to supply missing node attribute values when all attribute values are not available from a custodian. For example, a particular global data source may have a sector attribute value that the custodian does not have, and if so, the substitute value indicating sector may be added to a node attribute. As another example, if data previously received from a custodian is determined to be stale, then updated data could be requested from one of the global data sources.

Further, overriding prior values is made straightforward through the representation of ownership relationships in graph edges, whereas nodes represent assets per se, possibly with value attributes. Consequently, modifying a value attribute of an asset node, based on received market-based values, enables the received values to affect all calculations that reference the asset node. Other asset node attributes may propagate in a similar manner. For example, if a particular RIA user modifies an asset node representing ALPHA COMPANY to add an earnings report document as an attribute, all clients of that particular user who own positions in ALPHA COMPANY obtain access to the earnings report through principles of object inheritance.

Figure 4:
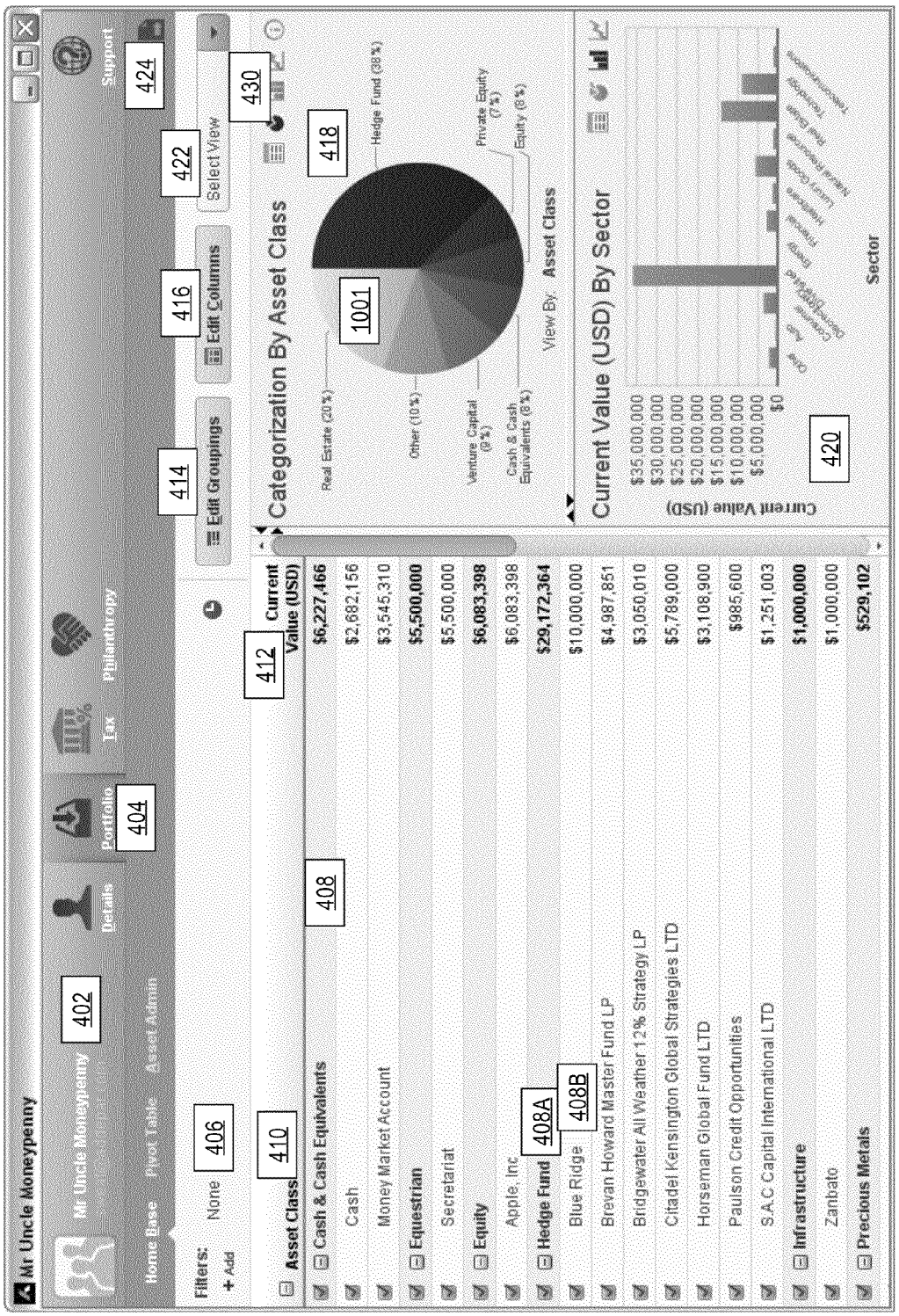
FIG. 4 illustrates an example of a graphical user interface for a computer display unit.

In an embodiment, view computation unit 106 is configured to transform graph 102 into one or more table views, graphs, charts, and other output. For purposes of clearly illustrating the example embodiments which follow, FIG. 4 illustrates an example of a graphical user interface for a computer display unit. In an embodiment, the elements of FIG. 1 and the output of FIG. 4 are implemented using the ADDEPAR computer software system commercially available from Addepar, Inc., Mountain View, Calif.

FIG. 4 illustrates a view of holdings from the perspective of an individual named Uncle Moneypenny as indicated by Perspective label 402. A Portfolio tab 404 indicates that the user is viewing a portfolio of holdings of Moneypenny. A Filters region 406 indicates that no data display filters are presently applied to change a view of the data in the GUI. Selecting an Add link in the Filters region causes view computation unit 106 to display a GUI widget that may receive definitions of filters, as further described herein.

FIG. 4 comprises a table view 408 which, for purposes of illustrating a clear example, comprises rows organized by asset class as indicated by an Asset Class bucketing label 410 and columns showing asset class name and current value as indicated by column label 412. Assets within Asset Class 410 are organized in a hierarchy or tree in which boldface labels 408A indicate an asset class bucket and non-bold labels 408B indicate individual assets within the associated asset class bucket.

In an embodiment, selecting an Edit Groupings widget 414 causes view computation unit 106 to display a GUI dialog that may receive reconfiguration of data values that determine the identity and order buckets and therefore the particular manner of displays of rows of the table view 408.

Figure 6:
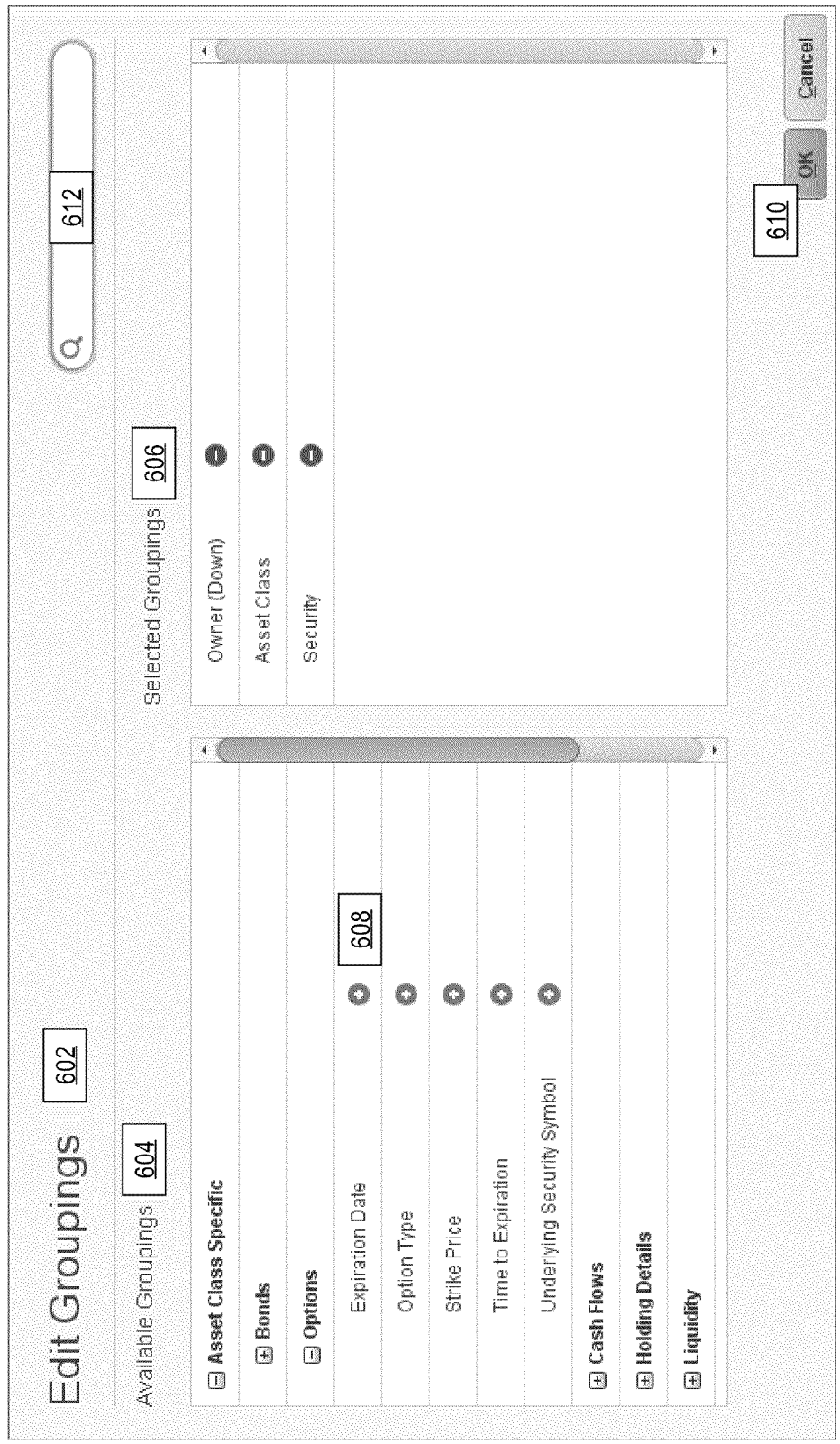
FIG. 6 illustrates an example Edit Groupings dialog that displays a list of currently selected groupings and a tree representation of available groupings.

FIG. 6 illustrates an example Edit Groupings dialog 602 that displays a list of currently selected groupings 606 and a tree representation of available groupings 604. A comparison of selected groupings 606 to FIG. 4 will show that the selected groupings of FIG. 6 are represented in FIG. 4. User selection of a remove (−) icon in the selected groupings 606 causes the view computation unit 106 to remove the selected grouping from selected groupings 606; subsequent selection of OK widget 610 in dialog 602 causes view computation unit 106 to close the dialog and re-display the table view 408 without the removed grouping. User selection of open (+) and close (−) icons in the tree display of available groupings 604 causes categories of groupings to open until leaf nodes of the tree are shown. For example, in FIG. 6 the user has selected open icons for Asset Class Specific and Options, yielding a list of available option groupings 608.

Figure 8:
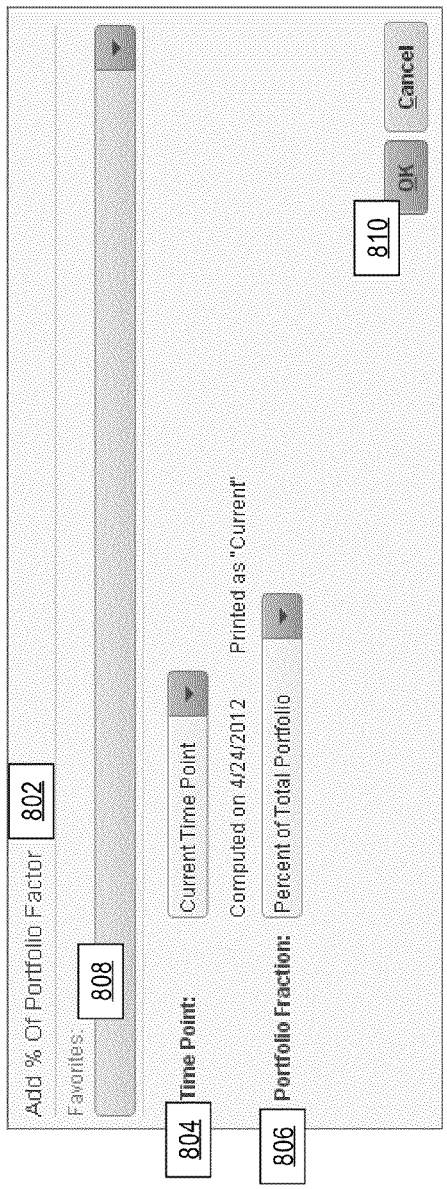
FIG. 8 illustrates an example configuration dialog for a Factor.

Selecting an add (+) icon associated with any of the available option groupings 608 causes view computation unit 106 to add the selected option grouping to selected groupings 606; subsequent selection of OK in dialog 602 causes view computation unit 106 to close the dialog and re-display the table view 408 with the added grouping. For some groupings, selecting the add (+) icon causes view computation unit 106 to display a Factor details dialog that prompts the user to enter or confirm one or more configuration values associated with a Factor that drives the grouping. FIG. 8 illustrates an example configuration dialog for a Factor. For example, assume that a user selects, from Available Groupings, Holding Details and then % of Portfolio. In response, view computation unit 106 causes displaying dialog 802, which comprises a Time Point widget 804 and Portfolio Fraction widget 806 that prompt the user to select one of several available values using drop-down menus. Alternatively, the user may select Favorites drop-down menu 808, which associates labeled menu items with stored values for Time Point and Portfolio Fraction. Selecting the OK widget 810 causes view computation unit 106 to close the dialog and store the specified values for Time Point and Portfolio Fraction in association with the % of Portfolio Factor, for use in subsequent computations. Thus, the system provides extensive opportunities for flexible customization by specifying the desired basis for computation, without requiring custom programming of algorithms or methods for particular factor computations.

Referring again to FIG. 6, a search box 612 may receive user input of keywords associated with groupings and causes view computation unit 106 to update available option groupings 608 with values that match the keywords.

Figure 7:
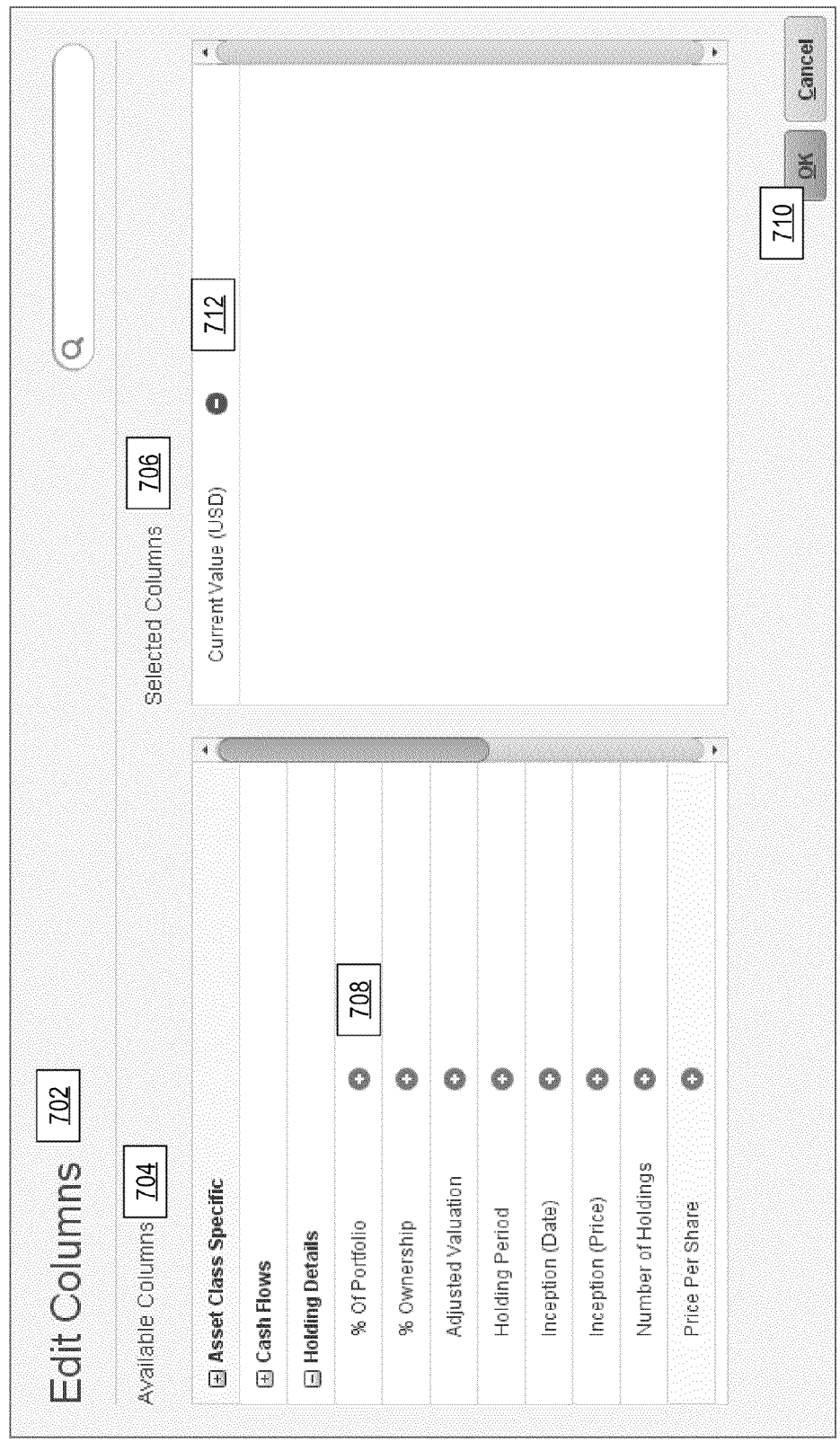
FIG. 7 illustrates an example Edit Columns dialog that displays a list of currently selected columns and a tree representation of available columns.

Referring again to FIG. 4, in an embodiment, selecting an Edit Columns widget 416 causes view computation unit 106 to display a GUI widget that may receive reconfiguration of data values that determine the identity and order of columns of the table view 408. FIG. 7 illustrates an example Edit Columns dialog 702 that displays a list of currently selected columns 706 and a tree representation of available columns 704. A comparison of selected columns 706 to FIG. 4 will show that the selected columns of FIG. 7 are represented in FIG. 4. User selection of a remove (−) icon in the selected columns 706 causes the view computation unit 106 to remove the selected column from selected columns 706; subsequent selection of OK widget 710 in dialog 702 causes view computation unit 106 to close the dialog and re-display the table view 408 without the removed column. User selection of open (+) and close (−) icons in the tree display of available columns 704 causes categories of columns to open until leaf nodes of the tree are shown. For example, in FIG. 7 the user has selected open icons for Holding Details, yielding a list of available option columns 708.

Selecting an add (+) icon associated with any of the available option columns 708 causes view computation unit 106 to add the selected option column to selected columns 706; subsequent selection of OK in dialog 702 causes view computation unit 106 to close the dialog and re-display the table view 408 with the added grouping. In some cases, selecting the add icon may cause the view computation unit 106 to display a dialog of the kind shown in FIG. 8 for groupings, with configuration parameter values applicable to the particular selected column. A search box 712 may receive user input of keywords associated with columns and causes view computation unit 106 to update available option columns 708 with values that match the keywords.

In an embodiment, the GUI of FIG. 4 further comprises a Select View dropdown menu 422 that may be used to select and apply different views that have been previously created and saved by others. For example, in FIG. 4 the GUI comprises a table view 408 and one or more info-graphics such as categorization pie chart 418, and bar chart 420. As an example, table view 408 reflects an ownership breakdown by asset class and value; other view selections may cause view computation unit 106 to display different combinations of buckets and columns, tables, charts and graphs. In FIG. 4 and other drawing figures herein, the info-graphics comprise a pie chart and a bar chart, solely to illustrate clear examples; however, in an embodiment, the GUI of FIG. 4 comprises two or more info-graphic option icons 430 indicating the availability of a table view, pie chart, bar chart, or line graph. Other embodiments may support info-graphics of other types. View computation unit 106 is configured to receive user input selecting one of the info-graphic option icons 430 and, in response, to change the info-graphic panel adjacent to the selected option icon to a different form of info-graphic. For example when pie chart 418 is displayed, selecting a line graph icon from among option icons 430 causes view computation unit to display a line graph in place of the pie chart and using the same underlying data as a basis for the line graph.

Figure 13:
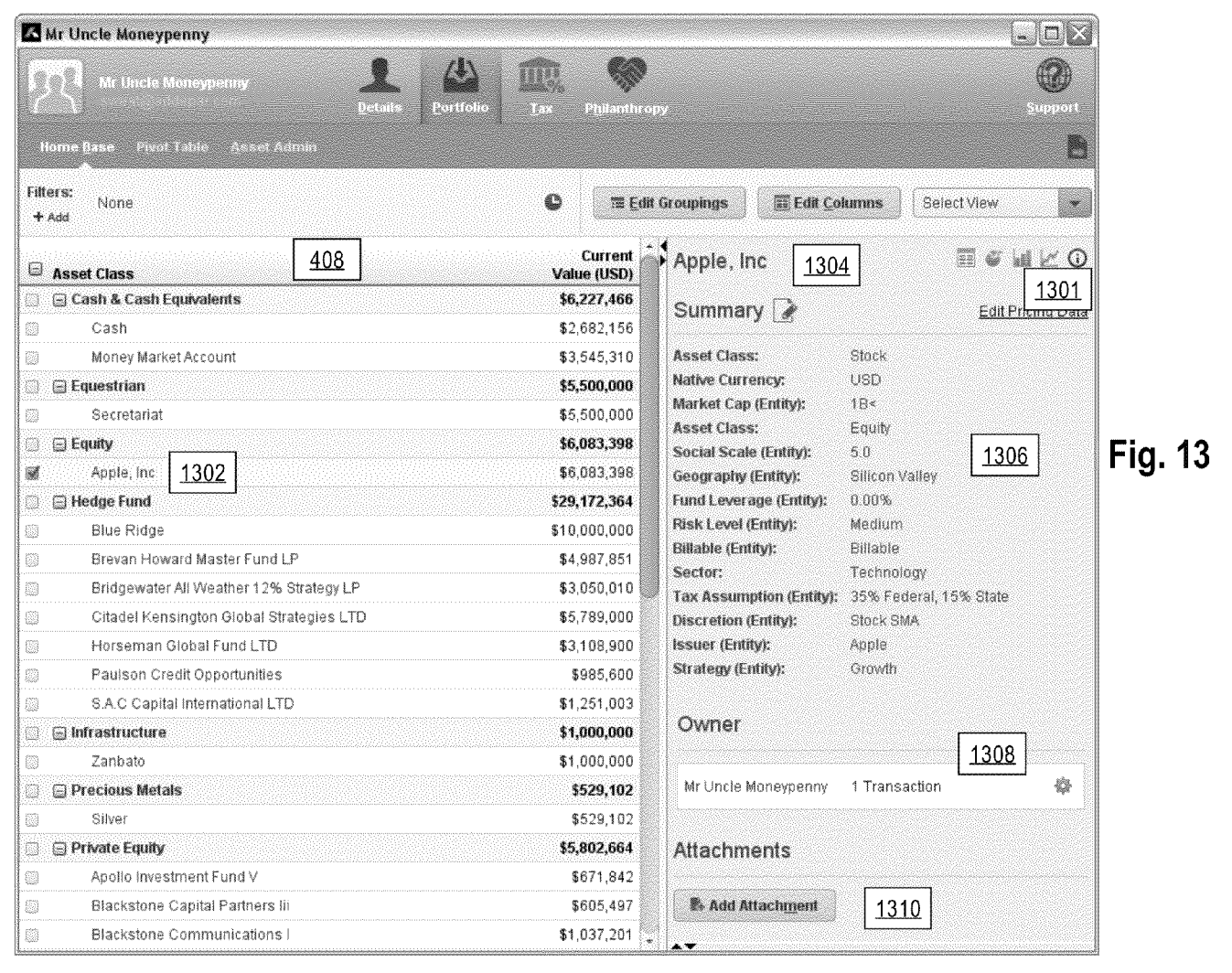

In an embodiment, icons 430 include an asset details icon that may trigger display of detailed information about a particular asset that has been selected in the table view 408. FIG. 13 illustrates the display of FIG. 4 showing asset details. In the example of FIG. 13, in table view 408 one asset 1302 is selected as indicated by a checkbox in the row of the selected asset, and asset details icon 1301 has been selected. View computation unit 106 is configured, in response to a selection of the asset details icon 1301, to cause displaying in the info-graphics area of the display, an asset details panel 1304 comprising a summary sub-panel 1306, owner sub-panel 1308, and attachments sub-panel 1310. In an embodiment, summary sub-panel 1306 lists attributes pertaining to the selected asset, which view computation unit 106 may obtain by retrieving from data repository 104. Owner sub-panel 1308 specifies one or more owners of the selected asset; the owners are those individuals, clients or legal entities that are associated with the current logged in user of the system. For example, when the user is an RIA, the Owner sub-panel 1308 may identify all clients of that user who have a position in the selected asset. Owner sub-panel 1308 further comprises a selectable hyperlink label indicating the number of transactions that each owner has completed for the selected asset; in the example of FIG. 13, "1 Transaction" is indicated. View computation unit 106 is configured, in response to selection of the hyperlink label, to retrieve information describing the transactions of that owner and display transaction detail in a pop-up menu. Consequently, a user is able to rapidly obtain transaction data for assets of clients or legal whose holdings are represented in the system, from within a display that has extensive viewing capabilities.

Figure 5:
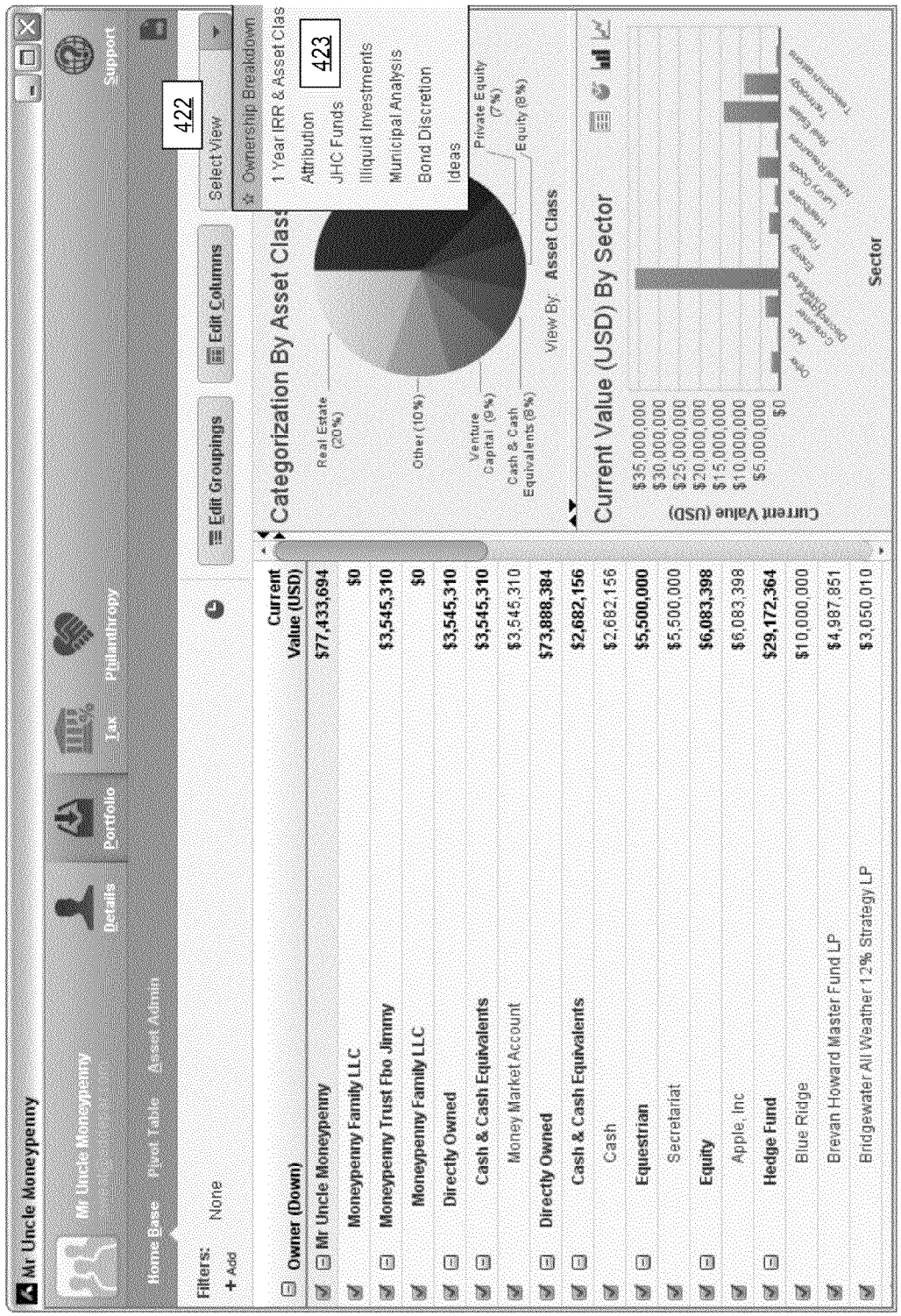
FIG. 5 illustrates the display of FIG. 4 in which dropdown menu has been selected and shows a plurality of named previously created views in a list.

FIG. 5 illustrates the display of FIG. 4 in which dropdown menu 422 has been selected and shows a plurality of named previously created views in a list 423. Selecting any particular view from list 423 causes view computation unit 106 to replace table view 408 with a new view based on the bucket Factors and column Factors that were defined for the selected view, and to update pie chart 418 and bar chart 420 based on the data in the new view. Replacement of the view involves re-computing the view based on the bucket Factors, column Factors and current Perspective of Moneypenny, in the manner described further herein. In some embodiments, pie chart 418 and bar chart 420 are replaced with different graphical views of data or removed completely.

In an embodiment, each of the info-graphics such as pie chart 418 and bar chart 420, by default, display charts and graphs based on the data that is then currently shown in table view 408. However, in an embodiment, view computation unit 106 is configured to respond to a selection of any of the info-graphics by updating the table view 408.

In an embodiment, the GUI of FIG. 4 further comprises an Export widget 424 which, when selected, begins operation of a report and data export function, as further described herein.

Embodiments operate in part based upon stored data representing a Context of a particular view of the graph 102. In an embodiment, a Context comprises a Perspective and a Date. A Perspective indicates an individual, legal entity, or group and a Date indicates a time point at present or in the past. For example, a view of graph 102 from the Perspective of Ken may be different than a view generated from the Perspective of Beth. In an embodiment, a Perspective may comprise two or more individuals, such as a husband and wife, groups, or multiple legal entities. A change in Perspective results in a change in calculations of values of assets, in many cases. For example, the value of an asset from a particular Perspective typically depends upon the percentage of ownership of a particular person or legal entity. As an example based upon graph 102, the percentage of ownership in Beta Holdings LLC may be quite different for Beth and for Alpha Holdings LLC because of the presence or lack of intervening individuals or legal entities with different ownership arrangements, shares or percentages.

Graph 102 may be represented in a backing store such as a relational database system, represented in FIG. 1 by data repository 104. In an embodiment, each node in graph 102 is a row in a table in the database. An Edges table identifies edges in graph 102 in terms of identifiers of nodes from which an edge begins and to which an edge connects (FromID, ToID). In an embodiment, during operation all rows from the database are loaded into main memory and organized in a graph representation in memory for use during a user session. In an embodiment, view computation unit 106 interacts with graph model logic 112 to implement a graph model and perform graph manipulation operations; in various embodiments, the graph model logic may comprise custom code or may be based on an open-source project such as Tinkerbell.

Embodiments also apply one or more Factors as part of generating views. In an embodiment, a Factor may be any recognized financial metric. A Factor, for example, may be internal rate of return (IRR). A Factor is a computational unit that receives, as input, a path from a graph such as graph 102 and a Context.

For a table view, each Factor may be used as either a bucketing Factor or a column Factor. An example of a bucketing Factor is asset class, and an example of a column Factor is value. Based on such a configuration, an output table view would comprise rows identifying asset classes and a value for each asset class. The configuration of asset class as a bucketing Factor and value as a column Factor causes the view computation unit 106 to compute values by traversing graph 102 and consolidating values in terms of asset classes. In an embodiment, configuring a column Factor may be accomplished by selecting a user interface widget and selecting a Factor from a drop-down list. Selecting an additional column Factor causes view computation unit 106 to re-compute the table view by again traversing graph 102. For example, if IRR is configured as a column Factor, and rows in the table view represent Instruments, then the table view will comprise a column that shows an IRR value for each Instrument.

Further, selecting a second bucketing Factor causes the computation unit 106 to re-compute the table view by consolidating values in terms of the second bucketing Factor; the resulting table view is displayed hierarchically so that multiple bucketing Factors are nested. For example, these techniques allow generating a table view that displays assets by asset class, then by owner, etc. In an embodiment, a user may re-order the bucketing Factors within a graphical list of all selected bucketing Factors, and the re-ordering causes the computation unit 106 to re-compute and re-display the table view using a different hierarchy of bucketing Factors based on the re-ordered list of bucketing Factors.

3.0 Generating Table Views from Graphs

Figure 2:
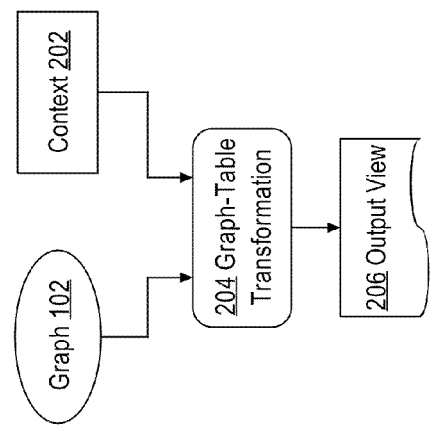
FIG. 2 illustrates a high-level view of a transformation.

To display a view of the data in graph 102 in a form that is familiar to the typical user, the graph is transformed into a table view consisting of rows and columns for display in a graphical display of a computer display unit. FIG. 2 illustrates a high-level view of a transformation. In general, a graph 102 and a Context 202 are received as input to a graph-table transformation 204, which generates an output view 206. The output view 206 may comprise a table, chart, or other output that is visually perceivable at a graphical display unit.

Figure 3A:
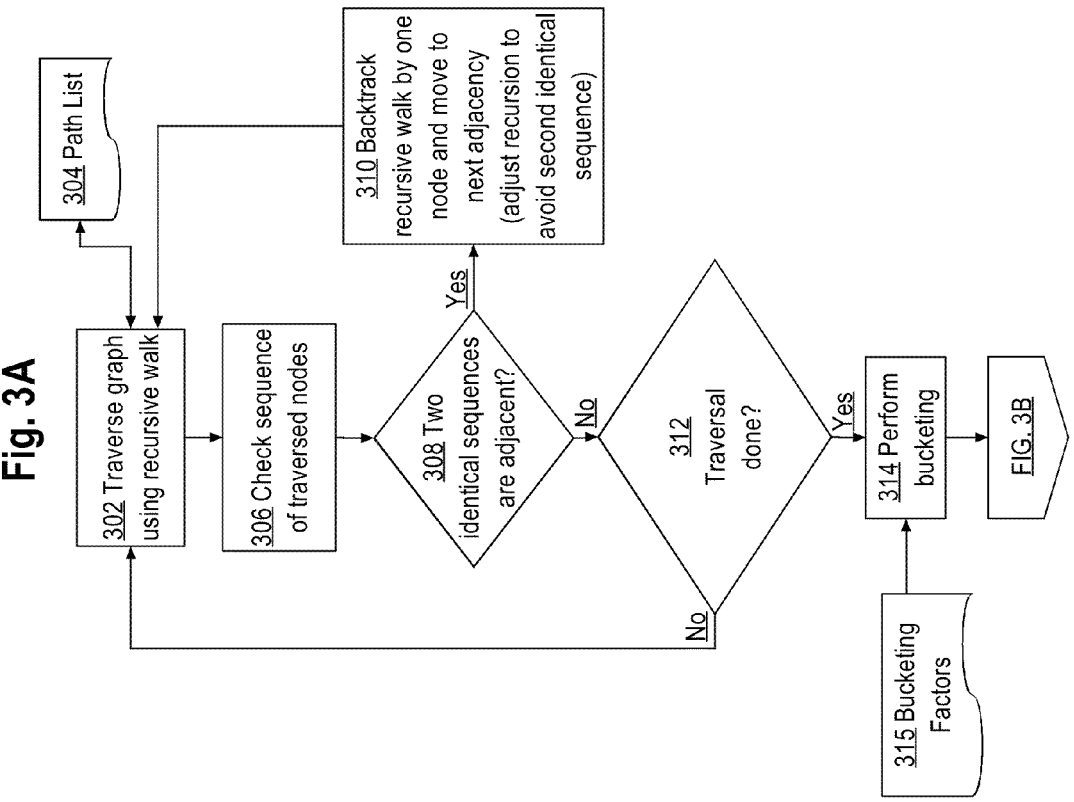
FIG. 3A illustrates a process of generating a table view based on a graph representing a set of financial asset holdings.

FIG. 3A illustrates a process of generating a table view based on a graph representing a set of financial asset holdings. In an embodiment, a view of data in a particular Context is created by computer-implemented processes that walk graph 102, creating and storing a plurality of paths within the graph. In block 302, the graph is traversed and a plurality of paths through the graph are stored in a path list 304. Traversal may use recursive transition techniques and either depth-first or width-first traversal is workable. In an embodiment, the graph is traversed starting at a source node as specified by the Perspective of the Context. For example, assume that the Perspective is Ken; graph traversal begins at the Ken node and the path list 304 would contain:

[Ken]
[Ken, Trust]
[Ken, Trust, Alpha Holdings LLC]
[Ken, Trust, Alpha Holdings LLC, Beta Holdings LLC]
[Ken, Trust, Alpha Holdings LLC, Beta Holdings LLC, Brokerage Account]
and so forth.

Changing the Context causes the view computation unit 106 to re-compute a set of paths from the changed Perspective or Date represented in the changed Context. For example, if a user during a single session changes from Ken to Beth, any and all displayed table views would re-compute and would be re-displayed, illustrating holdings from the Perspective of Beth. The Perspective also could be for Trust, causing the view computation unit 106 to re-display a table view illustrating values from the point of view of the Trust without regard to what percentages are owned by particular human individuals.

Because the same processes described herein are re-performed based on a different root node as indicated by the Perspective, the processes herein offer the benefit of rapid generation of completely different asset value and holdings displays even when the newly selected Perspective is unrelated to a prior Perspective. Further, users have complete flexibility in how to display asset holdings and custom programming is not required to obtain displays that reflect different roll-ups or different user ownership regimes.

For example, FIG. 9A illustrates a home screen display 902 illustrating a portfolio summary view from the Perspective of Clients. In an embodiment, display 902 comprises a view type pull-down widget 904 which, when selected, displays a list of available views. Selecting a New widget 906 opens a dialog in which a user may specify configuration values for a new Person or Group, which then can be referenced in views. In the case of a Clients view, screen display 902 comprises a Client column 902 that identifies a person, a Current Value column that identifies aggregate current value of all holdings of that client, and a Last Viewed column that indicates the last time that the current user viewed the data.

Figure 9B:
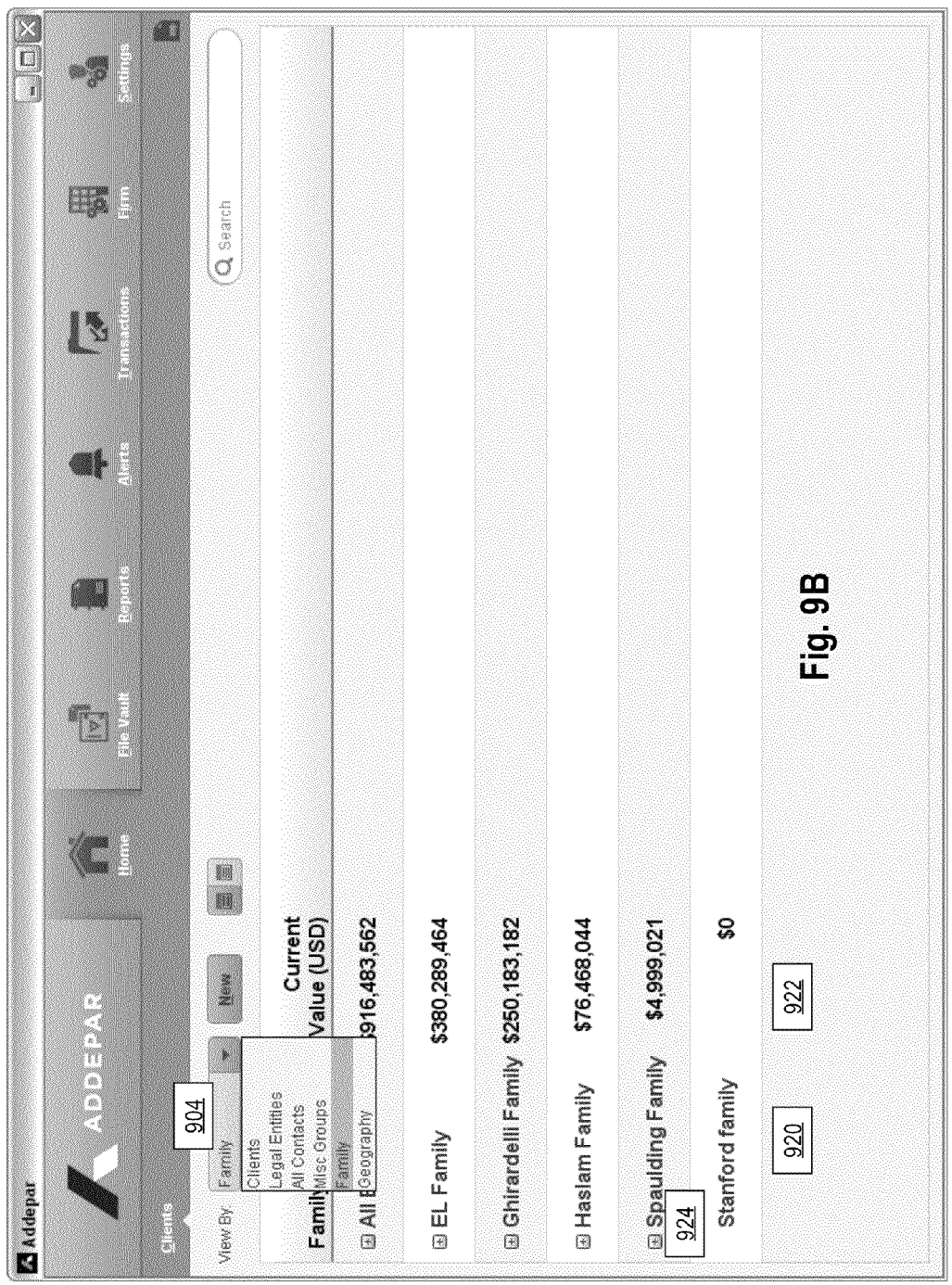
FIG. 9B illustrates another example in which widget and a Family option has been selected.

FIG. 9B illustrates another example in which widget 904 and a Family option has been selected. In response, view computation unit 106 has re-traversed the graph 102 and consolidated values based on family membership; to support such a view, family relationships are represented in graph 102, for example using edges labeled as family relationships to connect nodes of various individuals. In the example of FIG. 9B, the view comprises a Family column 920 and Current Value column 922, which are the only columns defined for the Family view. Selecting an open (+) widget for a particular Family causes the view computation unit 106 to display child nodes of the named family and Current Value totals for the child nodes. Similar views may be generated for legal entities such as trusts. A view of Current Value for a legal entity such as a trust is given from the trust's perspective and will indicate total value of all known assets, even if the current user (for example, a particular financial advisor) only works with one individual who owns a minority stake in the trust.

The example of FIG. 1 includes circular references, and FIG. 3A implements logic to prevent block 302 from causing an infinite loop, while permitting accurate representation of the value of assets by permitting edges to loop back once. In particular, FIG. 3A incorporates logic that permits a cycle to occur only once. In an embodiment, at block 306, a sequence of already traversed nodes is periodically checked and in block 308 the process tests whether two identical sequences are adjacent. For example, if nodes are labeled with alphabetic character labels, then the traversal sequence ABCAB is considered valid, but the sequence ABCABC is invalid. Although the first sequence includes two instances of path AB, the instances are not adjacent; however, in the second sequence, two instances of path ABC are adjacent and therefore invalid. Referring again to FIG. 1, the sequence [Ken, Trust, Alpha Holdings LLC, Beta Holdings LLC, Ken, Alpha Holdings LLC] is valid, but [Ken, Trust, Alpha Holdings LLC, Beta Holdings LLC, Ken, Trust, Alpha Holdings LLC, Beta Holdings LLC] is invalid.

In block 310, upon detecting an invalid identical adjacent sequence, the process backtracks the recursive walk of the graph by one node and moves to the next adjacency. In effect the process adjusts internal recursion steps to avoid re-traversing a second identical sequence. Traversal continues until all nodes, edges and adjacencies have been traversed, as represented in the test of block 312. Upon completion path list 304 is fully populated with all valid paths through the graph.

Figure 3B:
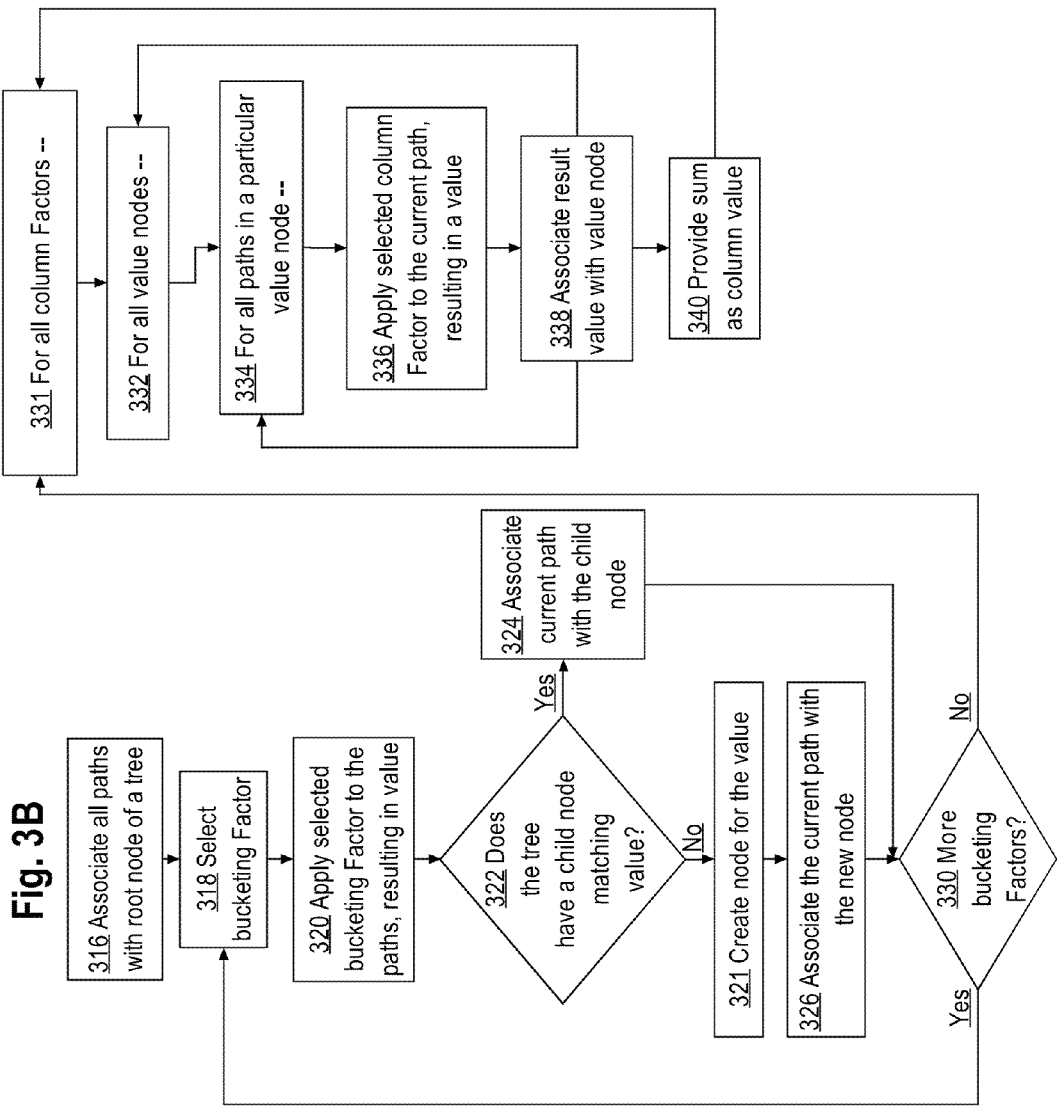
FIG. 3B illustrates other steps in the process of FIG. 3A.

At block 314, a bucketing process is performed to form nodes in the paths into a tree or other hierarchy of buckets as specified by the then-current configuration of bucketing Factors 315. Referring now to FIG. 3B, at block 316, a root node for the tree is created in memory and initially all paths in the path list 304 are associated with the root node. At block 318, a bucketing Factor is selected, and block 318 forms a loop with block 330 that iterates through all configured bucketing Factors. For example the first selected bucketing Factor could be asset class.

At block 320, the selected bucketing Factor is applied to all the paths in the path list 304, resulting in generating a value for the bucketing Factor. The following pseudocode represents applying a factor in an embodiment:

```
for (path: paths) {
    vat = factor.apply (path) }
factor <T>
T    apply (list <Path>, Context)
```

If the first selected bucketing Factor is asset class, then the resulting value val might be Stock, Bond, etc. At block 321, a node in the tree hierarchy is created for the value; for example, a Stock node is created. At block 322, the process tests whether the current node (initially the root node) has a child node that matches the value. Thus, one test would be whether the root node has a Stock node as a child node. If the result is YES, then the current path is associated with the child node. For example, if the current node has an ALPHA COMPANY Stock node as a child, then the ALPHA COMPANY Stock child node is associated with the current path as shown at block 324. If the result of the test at block 322 is NO, then at block 321 a new node is created for the value node and at block 326 the newly created node is associated to the current path.

In various embodiments, various filtering or correction processes may be applied to improve the appearance or analytical value of the result of bucketing. For example, certain bucketing Factors may return values that are too granular to justify creating a new value node, so the return values could be aggregated into a larger bucket. As a particular example, if IRR is a bucketing Factor and returns a value of 1.2, the process could elect to associate that result with a "1.0 to 5.0" IRR bucket, and associated value node, rather than creating a new value node just for IRR results of 1.2.

In an embodiment, configuration data may define the range of values that are included in a particular bucket, so that the nature of buckets may be customized on a per-user or per-session basis. For example, assume that a user wishes to classify stock assets as Large Cap, Mid Cap, Small Cap; different users may wish to define ranges of market capitalization differently for each of the three (3) classifications. In an embodiment, graphical user interface widgets may be selected to identify particular bucketing Factor values and the ranges of result values that each bucketing Factor should yield. Further, in an embodiment, any user may create any other desired new bucketing Factor by configuring a generic bucketing Factor to trigger on the presence of a particular metadata value in a particular asset or node. For example, a user could create a Hedge Fund Strategy (Quant) bucketing Factor that will classify assets into a node, ultimately causing reporting them as a row in a table view, when the value of a Hedge Fund Strategy metadata attribute of an asset is Quant.

Iterating to another bucketing Factor by transferring control from block 330 to block 318 results in re-processing path list 304 for a different bucketing Factor, for example, Country.

When all paths have been processed in the steps preceding block 330 for all configured bucketing Factors, the result is a set of nodes, representing each bucketing Factor, each having associated therewith all paths to nodes that match the value yielded by applying the bucketing Factor to a path. The effect is that each node representing a bucketing Factor has associated with it all matching paths and nodes in the graph 102. For example, if path list 304 comprises 100 paths, then a first bucketing Factor node for Stocks might have 50 paths, a Bonds node might have 40 paths, and a Commodities node might have 10 paths.

The association of paths with a bucketing Factor node, as opposed to individual assets or terminal nodes that represent assets provides a distinct difference as compared to other systems and provides special benefits for various other features of the systems as further described. For example, a particular Perspective, such as Ken or Beth, may have multiple paths to the same ultimate asset. The present system provides ways to consolidate or roll-up multiple different paths into a single value for a particular asset, regardless of the number, complexity or direction of the paths. For other features and reasons, the paths also matter, as subsequent description will make clear.

At block 331, the process of FIG. 3B performs column processing using each value node in the tree that was created and associated with paths in preceding steps. As shown at block 331, all configured column Factors are processed and block 331 represents starting an iteration of subsequent block for all such configured column Factors.

As indicated in block 332, for a particular column Factor, all value nodes are considered iteratively; further, block 334 represents iterating through all paths in a particular value node. For each such path, at block 336, a particular column Factor is applied to the current path, resulting in a value; as noted above, a Factor receives one or more paths and a Context as input, both of which are known and available at block 336. The same pseudocode as provided above may be used.

The resulting value is associated with the current value node at block 338. When all paths for a particular value node have been processed, the sum of all values that have been associated with the value node may be returned as a column value for display or inclusion in a table view for a row associated with the value node. Processing continues iteratively until all column Factors have resulted in generating values for all columns of that row or value node.

Each column Factor may define a complex calculation by overriding a method in a class definition for a generic column Factor. For example, a Factor may call an ownership determination method to determine a percentage of ownership represented in a path as a precursor to computing a value of an asset. A Factor may call another Factor to perform such a computation. For example, a value Factor may call a percent-ownership Factor, which in turn could perform a matrix multiplication to determine percent ownership, and the value Factor may multiple the resulting percentage value by a current value of an asset to determine a particular Perspective's value for the asset.

Factors may implement complex logic for concepts such as internal rate of return. For example, a Factor may compute a date on which Beth became a trustee of the Trust, determine values of all transactions that occurred on or after that date, separately call a value Factor to determine a current-day value of each asset involved in each such transaction, etc.

In various embodiments, control steps may be performed in the processes of FIG. 3A, FIG. 3B to improve the quality of display. For example, if a Factor returns a result of "unknown value," the resulting column value may need to be modified or removed for a particular value node, since the user cannot gain any added information from an unknown column. The result would be that a particular section of a table view or tree represented in the table view would have blank column values.

Embodiments facilitate the ability to perform multi-currency displays and calculations so that values in multiple currencies are concurrently displayed in the same table view. For example, the Edit Columns dialog may be used to select a Value factor, and add it as a column to a table view, that is expressed in any of a plurality of currencies or in a Native Currency, which is the currency in which the underlying asset is actually held or tracked by a custodian. Any number of such columns may be added to a particular table view by repeatedly selecting the Edit Columns dialog, adding the Value factor with different currency values, and applying the selection to the view.

Figure 9C:
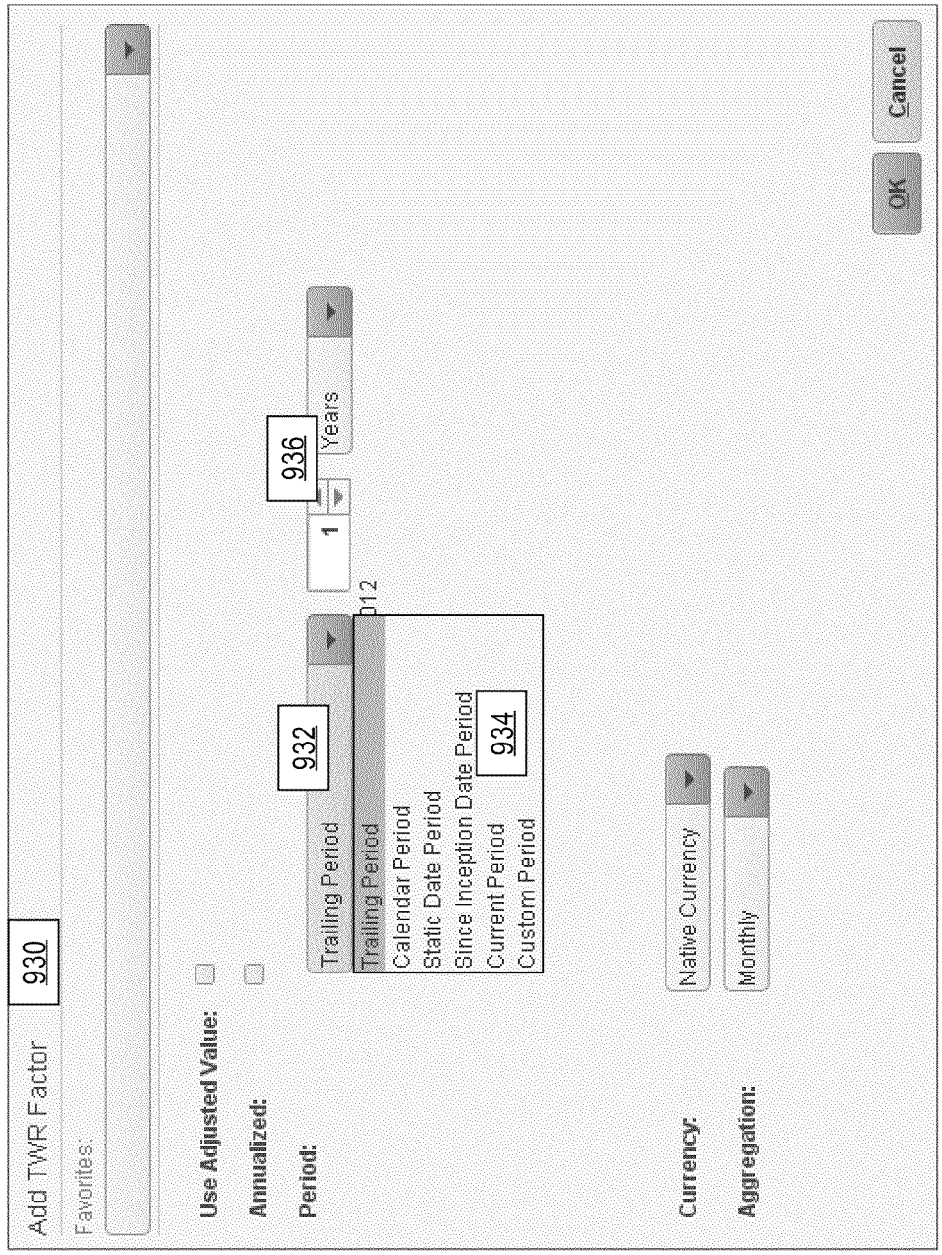
FIG. 9C illustrates an example of an Add TWR Factor dialog resulting from selecting the Edit Column dialog, selecting Performance Metrics from among the Available Columns, and adding TWR Factor as a column.

Embodiments provide the ability to display views of asset values for multiple different time periods in different columns within the same view. FIG. 9C illustrates an example of an Add TWR Factor dialog 930 resulting from selecting the Edit Column dialog, selecting Performance Metrics from among the Available Columns, and adding TWR Factor as a column. (TWR refers to Time Weighted Rate of Return.) In response, the view computation unit 106 causes displaying an Add TWR Factor comprising a Period drop-down menu 932 having a list 934 presenting a plurality of time period options. For example, for a particular view a user may add a column for TWR based on a Trailing Period, Calendar Period, Static Date Period, Since Inception Date, Current Period, or Custom Period. For some options the user is expected to enter time quantity and term values using time widgets 936. When the configuration values of dialog 930 are applied to a view, applying the TWR Factor to a traversal of the graph 102 will result in performing calculations based on available historical asset data for the time periods as specified. A user may add multiple TWR Factor columns to a particular view, each column having a different Period configuration, for example, to permit comparison of asset performance to benchmarks using different metrics of interest.

Changing the Date associated with the Context does not necessarily affect all date periods for the TWR Factor or other factors in the same manner. For example assume that the foregoing TWR Factor columns have been configured, that the current date is March 30, and then the user changes the Date associated with the Context to be March 1. The TWR Factor that is based upon a 1-year trailing date would then compute values based on March 1 and 1 year earlier. A TWR Factor that is based on a Start Date and End Date would use March 1 as the new Start Date but the End Date would be unchanged. A Factor that is based on a static date would be unaffected. Thus, the system offers the capability to independently control each column of a table view based on configuration data. Further, modification of date values in this manner enables a user to preview the impact of the change on output data that may be used later in a report.

Filters may be used to further customize the appearance or content of a table. A filter is a computational unit, such as a programmatic object, that determines whether edges and nodes in one or more paths should be reflected in output data in a table view. Filters are applied to paths using the processes described above, on a per-path basis. Thus, creating and applying a filter causes view computation unit 106 to re-traverse all paths of the current view and to apply the filter during path traversal; this approach contrasts sharply with approaches of others in which filtering is merely applied to an output table or to a dataset that has been retrieved from a database. Further, filters may be applied to entities that are not visualized in a particular table view. For example, a view may be filtered to show the top 10 holdings based on IRR, even though IRR is not present in the table view.

Figure 10:
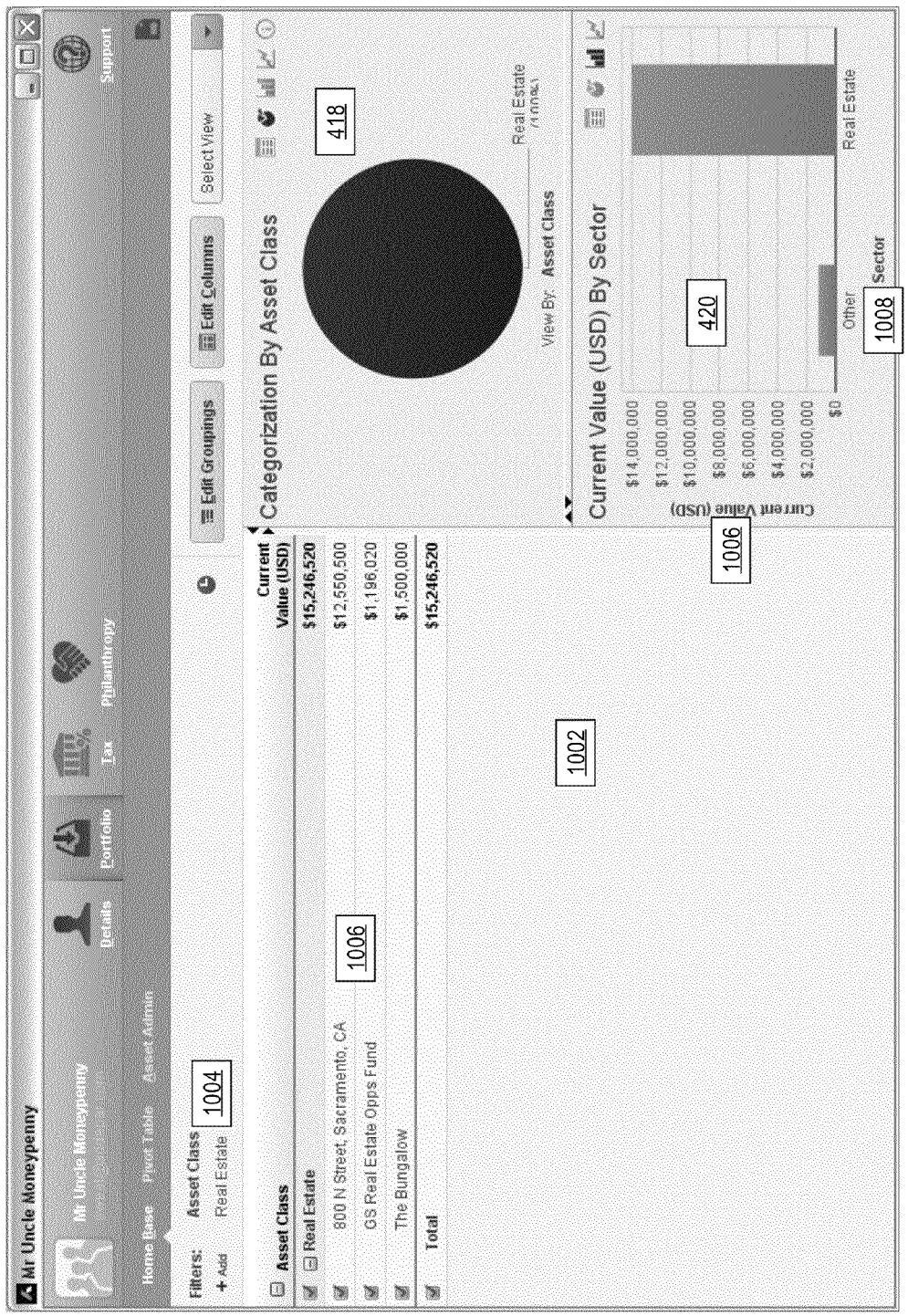
FIG. 10 illustrates the GUI of FIG. 4 after applying a Real Estate filter.

Filters may be created through manual user selection and action by selecting the Filters Add (+) icon and responding to a filter creation dialog, or semi-automatically by selecting elements of info-graphics. In an embodiment, info-graphics such as charts 418, 420 are configured with hyperlinks that cause the view computation unit 106 to create a filter and apply the filter to the table view 408. FIG. 10 illustrates the GUI of FIG. 4 after applying a Real Estate filter. In an embodiment, a user may select any pie wedge in the pie chart 418, or any bar in the bar chart 420, to cause creating a filter. In the example of FIG. 10, the user selected the Real Estate wedge 1001 of the pie chart 418 in the display of FIG. 4; in response, view computation unit created a filter 1004 as seen in the filter region and applied the filter to the table view to result in displaying only real estate assets. Further, the filter is concurrently applied to both the info-graphics with the result that the pie chart displays a single solid circle since 100% of the assets listed in the table view are real estate assets. The filter 1004 may be removed by hovering a cursor over the filter and selecting a remove (X) icon. The same form of filter control may be activated by selecting a bar of the bar chart 420.

Conversely, if the filter region of the table view is used to define one or more filters, then the info-graphics automatically update to reflect the filters that have been newly applied.

In an embodiment, the same basic processes described above for generating table views may be applied to generating the pie chart 418 and bar chart 420. For example, the X axis of the bar chart 420 may be defined using a bucket Factor and the Y axis may be defined using a column Factor. For example, a bar chart may be defined by bucketing IRR on the X axis while particular values are determined using column Factor value generating techniques as described above for table views.

Figure 11:
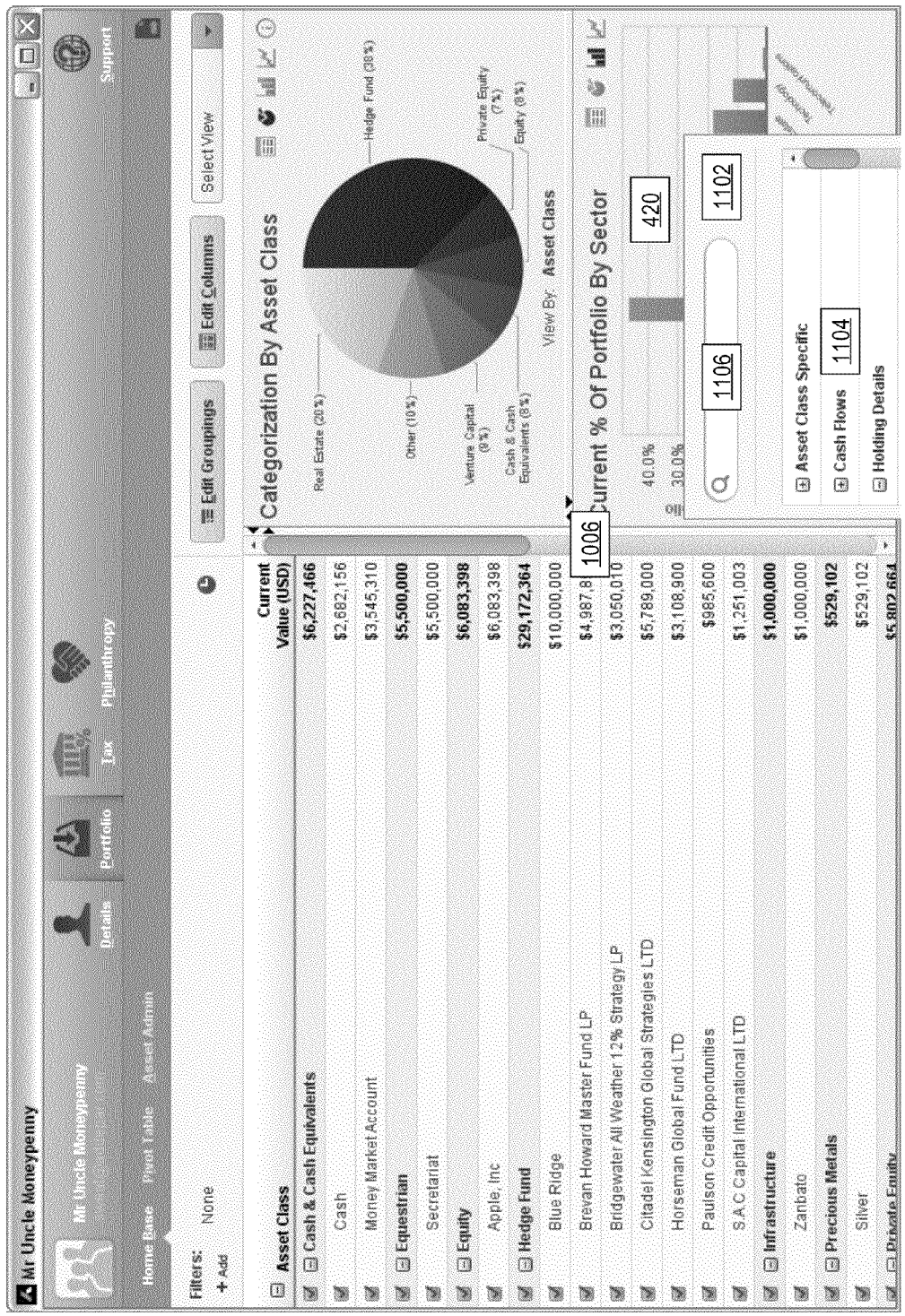
FIG. 11 illustrates the GUI of FIG. 4, FIG. 10 in which vertical axis label has been selected.

In an embodiment, bar graph 420 comprises a vertical axis label 1006 and horizontal axis label 1008 that are configured as selectable hyperlinks. View computation unit 106 is configured to cause displaying, in response to user selection of an axis label 1006, 1008, a pop-up menu listing available Factors that may be selected for use as axes. FIG. 11 illustrates the GUI of FIG. 4, FIG. 10 in which vertical axis label 1006 has been selected. View computation unit 106 is configured to cause displaying pop-up menu 1102 comprising a list 1104 of available Factors that may be selected as the basis of computing a new vertical axis for the bar graph 420. A user may scroll through list 1104 and select any Factor of interest, or type keywords for a Factor name in search box 1106 to receive a list of matching Factors. Selecting a Factor from list 1104 causes view computation unit 106 to cause closing the menu 1102 and recomputed the chart 420 using the newly selected Factor. A different Factor for the X-axis may be applied in a similar manner by selecting horizontal axis label 1008 and selecting a new Factor from a pop-up menu.

In an embodiment, Factors include value by any of a large plurality of currencies. Consequently, a user or analyst may view values by currency according to currency rates and conversions of the present day, with immediate recalculation by re-traversing the graph.

Figure 12:
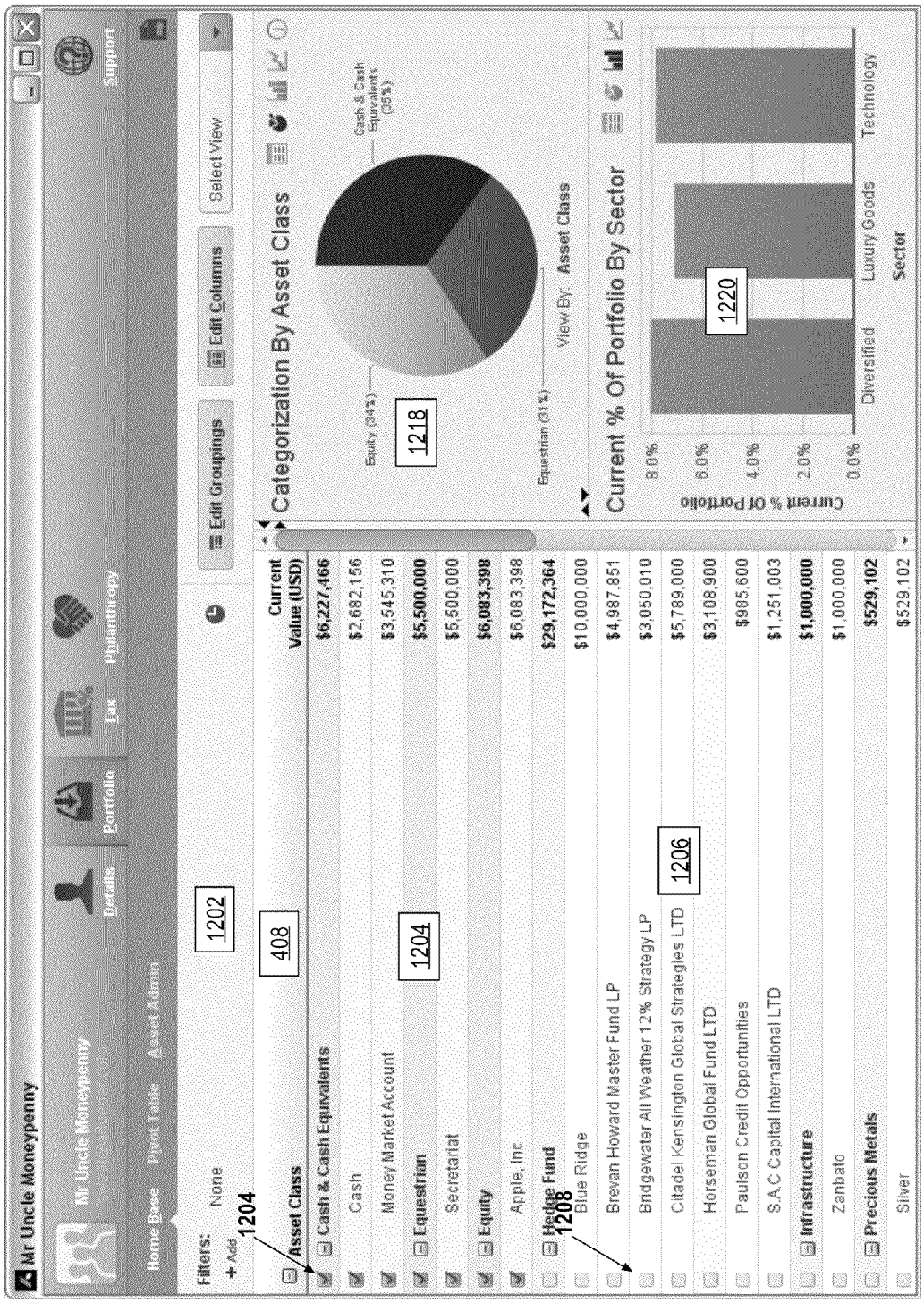
FIG. 12 illustrates an example in which some of the data in the table view is selected.

In an embodiment, view computation unit 106 is configured to re-compute and cause re-displaying info-graphics such as pie chart 418 and bar chart 420 based on changes in selections to data in table view 408. FIG. 12 illustrates an example in which some of the data in the table view is selected. In screen display 1202 of FIG. 12, table view 408 comprises a first set 1204 and a second set 1206 of rows indicating assets organized by asset class. The first set 1204 has been selected as indicated by checks in selection checkboxes 1204 while the second set 1206 is not selected as indicated by non-checked selection checkboxes 1208. In an embodiment, a range of rows may be selected by individually checking checkboxes 1204, 1208 or by selecting one row and then using keyboard control combinations such as SHIFT-click or CTRL-click to select a range of rows or multiple discrete rows. View computation unit 106 is configured to re-compute and cause re-displaying pie chart 1218 and bar chart 1220 to reflect only the selected rows and omit data associated with non-selected rows. For example in FIG. 12 it will be seen that pie chart 1218 comprises only three (3) wedges for Cash & Cash Equivalents, Equity, and Equestrian assets because the first set 1204 of rows comprises only assets in those asset classes. The sum of assets represented in the pie chart 1218 is the sum of only the first set 1204 of selected rows. Similarly, bar chart 1220 has been re-computed and redisplayed to reflect only the Sectors represented in the first set 1204 of selected rows.

In an embodiment, view computation unit 106 is configured to save a view of the type shown in FIG. 4, FIG. 5, FIG. 10, FIG. 11, FIG. 12 in response to user input requesting to save a view. In one embodiment, referring again to FIG. 4, a user may select the Select View menu 422 to cause displaying a list of named, previously saved views; one menu option is Save As. In response to receiving a selection of Save As in menu 422, view computation unit 106 is configured to cause displaying a dialog that prompts the user to enter a name for the current view. In response to receiving user input specifying a name, the view is saved in data repository 104 in the form of a named set of metadata defining the view. Example metadata that define a view include the Context, the Filters applicable to the view, the grouping and column Factors defining table view 408, and the Factors defining axes of the chart 420.

After a view is saved, a user may retrieve and use the view with any other Context. For example, the same user could change the Context to a different client or legal entity, and the view computation unit 106 is configured to apply, in response, the metadata defining the view to portions of the graph that relate to the newly selected client or legal entity. As a result, table view 408 and related info-graphics are re-computed and redisplayed to reflect holdings of the newly selected client or legal entity.

In an embodiment, when a user logs out and logs back in again in a later user session, the last saved view from the prior user session is used as the first view that is displayed in the new user session.

4.0 Exporting Views and Generating Reports and Publications

In an embodiment, view computation unit 106 is configured to export data shown in views to other applications or to other document formats such as MICROSOFT EXCEL or ADOBE PDF. In an embodiment, view computation unit 106 is configured to perform export operations based on the current view. For example, in one embodiment, exporting is initiated by a user selecting the Export widget 424. In response, view computation unit 106 causes highlighting all of the table view 408 and current info-graphics such as pie chart 418 and bar chart 420, and causes displaying, in each of the table view and info-graphics, a selectable icon representing an available export format for that area of the display. For example, view computation unit 106 may cause displaying an EXCEL icon and a PDF icon over the table view 408, but may display only a PDF icon over pie chart 418 and bar chart 420 since info-graphics of those forms cannot be exported in the form of an EXCEL table.

Figure 14:
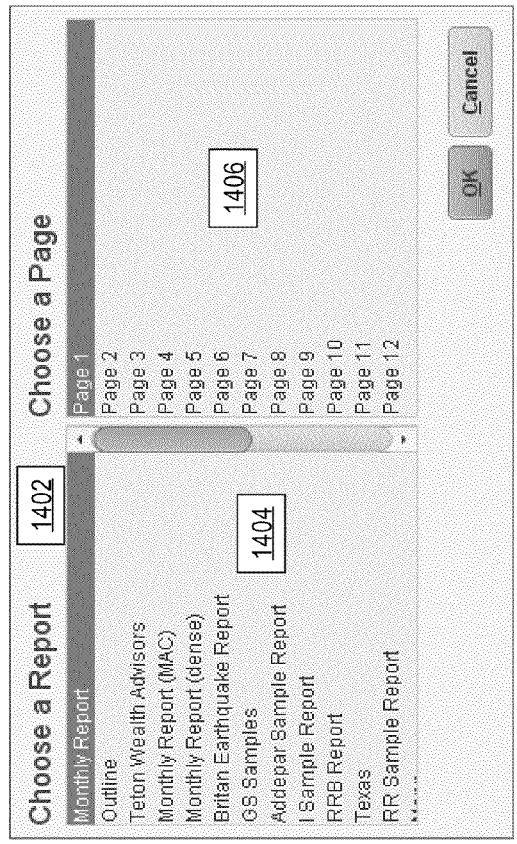
FIG. 14 is an example of a report selection dialog.

In an embodiment, view computation unit 106 is configured, in response to selection of one of the ADOBE PDF icons, to facilitate exporting data shown in views to a report center system that is configured to facilitate generating reports in the form of electronic documents. Embodiments facilitate creating reports in which the organization of pages is controlled and source data from a table view is gracefully fitted into the report pages rather than appearing as a direct cut-and-paste without appropriate fitting or formatting. In one embodiment, selecting the Export widget 424 and an ADOBE PDF icon causes displaying a report selection dialog. FIG. 14 is an example of a report selection dialog. In an embodiment, report selection dialog 1402 comprises a list 1404 of previously created and saved reports. View computation unit 106 is configured, in response to selection of a particular report in list 1404, to display a page list 1406 identifying all pages that have been previously defined in the selected report.

Figure 15:
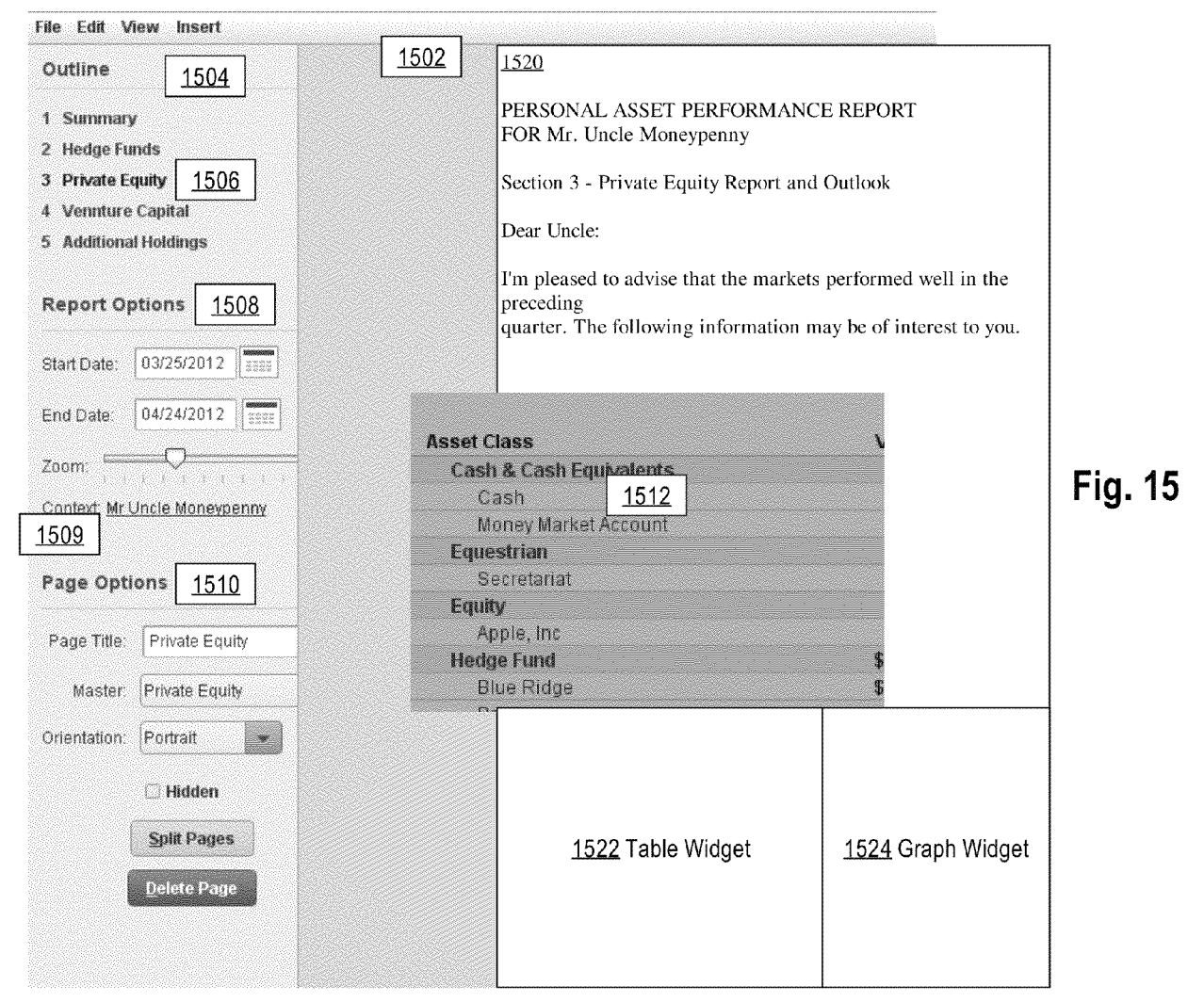

Selecting a particular page in page list 1406 causes view computation unit 106 to trigger execution of report unit 109 (FIG. 1). In response, report unit 109 causes displaying a report creation user interface. FIG. 15 illustrates an example of a report creation user interface as seen immediately after initiation of operation. In an embodiment, report creation user interface 1502 comprises an outline panel 1504, a report options panel 1508, a page options panel 1510, and a report view 1520. The outline panel 1504 presents an outline of sections or pages that have been defined in the selected report, and report view 1520 displays a graphical representation of a particular selected section or page. In the example of FIG. 15, Private Equity section 3 has been selected as indicated by link 1506.

In an embodiment, report options panel 1508 displays metadata and GUI widgets that may be modified to accomplish changes in the associated report. In an embodiment, report options panel 1508 includes Start Date and End Date widgets, a Zoom slider widget, and a Context link 1509. The Start Date and End Date widgets may be used to change a range of dates that are used for data in the report; in response to changing the values of Start Date or End Date, the report unit 1509 is configured to redisplay report pages for only data within the specified dates. The Zoom slider widget is configured to cause increasing or decreasing a size of the report view 1520.

The Context link 1509 specifies a context for the report in terms of a named individual or legal entity. The report unit 109 is configured to receive user input selecting the Context link 1509 and to display a list of other individuals or legal entities that are associated with the current logged in user. In response to receiving a selection of a different individual or legal entity, the report view 1520 is re-computed and re-rendered from the perspective of the next Context. Re-computation involves re-traversing the graph 102 in the manner described above for generating table view 408 of FIG. 4. As described further below, a report view 1520 may comprise a plurality of independent widgets for text, tables, and graphics, and in an embodiment changing the Context causes each widget to perform an independent traversal of graph 102 to re-compute values for display in that widget. Thus, working on a report involves creating and storing metadata that defines the components of the report and certain formatting attributes of the report, but not particular values in the report; instead, the current Context drives a traversal of the graph 102 to generate values for substitution into a view of the report based on the metadata. Moreover, the techniques herein have the benefit of separating the construction and format of a particular widget from the underlying data, so that programmatic changes in a widget will result in displaying the widget in updated form while rendering in correct and timely underlying data based on traversing the graph 102.

Page options panel 1510 provides options for changing the title of the current page and associating a master page with the currently displayed page. In an embodiment, a master page defines an authoritative set of formatting guidelines for a page, and applying a master page causes report unit 109 to conform the current page to the formatting guidelines. Examples of formatting guidelines include margins, allowable locations for graphics, allowable locations for tables, rules for preventing a table from splitting across a page boundary, and others. For example, assume that a user specifies, using the interface of FIG. 4, exporting a table view 408 that comprises 50 rows; then, by interacting with report unit 109 the user attempts to locate the table in a lower portion of a first page of a report so that the entire table cannot be shown on the first page. In an embodiment, report unit 109 is configured to detect that the table contains a number of rows too large to fit in an allowed table space as defined in the formatting guidelines of a particular master page, and to automatically move the table to the next page on which the table will completely fit.

In an embodiment, a report view 1520 comprises a plurality of rectangular widgets that may be designated as a table widget or graphic widget. For example, report view 1520 may include a table widget 1522 and a graphic widget 1524. A table widget 1522 is associated with a set of formatting guidelines that define how imported table data from a view such as FIG. 4 is to fit into the region of the report that contains the table widget. Similarly, a graphic widget 1524 is associated with a set of formatting guidelines that define how an imported info-graph such as pie chart 418 or bar chart 420 should fit into the region occupied by the graphic widget.

Figure 16:
FIG. 16 illustrates the report of FIG. 15 in which an existing table widget has been selected.

FIG. 16 illustrates the report of FIG. 15 in which an existing table widget has been selected. In an embodiment, report unit 109 is configured to receive user input indicating a selection of a particular existing table widget 1522 or graphic widget 1524 and to cause displaying a context-sensitive widget options panel 1530 to replace the page options panel 1510. In an embodiment, report unit 109 causes redisplaying the page options panel 1510 when a page-level element is selected in the report, such as a header, margin or border of the page. Widget options panel 1530 comprises one or more GUI widgets that may receive user input to modify attributes or properties of the particular existing widget that was selected. For example, when table widget 1522 is selected, widget options panel 1530 comprises a column properties button, font size widget, column gap widget, and Delete Widget button. In an embodiment, modifying the numeric value shown in the font size widget or column gap widget causes report unit 109 to cause redisplaying the table widget 1522 with a modified font size and modified spacing between columns, respectively.

In an embodiment, the use of a large font size may preclude rendering all of a set of table data within a particular table widget 1522 because the number of columns or overall width of the data exceeds the defined size of the table widget. In such a case, the table data is truncated and some data becomes invisible in the report in order to maintain the size, properties and appearance of the table widget. However, the invisible data is maintained in memory. Consequently, reducing the font size with options panel 1530 causes re-rendering the table widget 1522 in the reduced font size and automatically causes displaying additional table data that had been invisible prior to the font size change. Therefore, a user can move any desired table data from a table view 408 (FIG. 4) into a report without negatively affecting the appearance of the report, its pages, or specified widgets for holding table data, and the user can adjust the size or quantity of the displayed table data to fit the defined space. Aesthetic appearance of the report is maintained while permitting custom data to be applied to an existing report.

In an embodiment, selecting the column properties button from options panel 1530 causes the report unit 109 to display a column editing dialog. FIG. 17 illustrates an example of a column editing dialog. In an embodiment, column editing dialog 1702 comprises a column list 1704 organized by ordinal positions of columns in the table widget 1522, a name list 1706 comprising text fields specifying corresponding names of columns, and a format list 1708 comprising pull-down menus that may be used to specify a particular format for values in an associated column. In an embodiment, user input in a text field of list 1706 causes modifying the name of an associated column in table widget 1522 when a Finished button is selected. Further, selecting one of the pull-down menus in format list 1708 causes report unit 109 to cause a display of a format menu 1710 providing available formatting options for the associated column. In an embodiment, the menu options in format menu 1710 reflect an actual data value from the associated column of the table widget 1522 and not generic or dummy data values. User input may be received to select one of the menu options in format menu 1710 and apply that format to the table widget 1522. In response to user selection of the Finished button, report unit 109 causes closing the column editing dialog 1702 and redisplays the report in updated form based on the selections that were made in the column editing dialog 1702.

In an embodiment, activating the report unit 109 as described above causes the report unit to display a representation 1512 of the selected table view 408 over report view 1520. Representation 1512 is movable over the report view 1520 in response to user input from a pointing device. Report unit 109 is configured to respond to user input selecting a particular region of the report view 1520 by applying the data shown in representation 1512, and for all other data associated with the underlying table view 408, to the report. Consequently, the report view 1520 is augmented with the data from table view 408.

Figure 18:
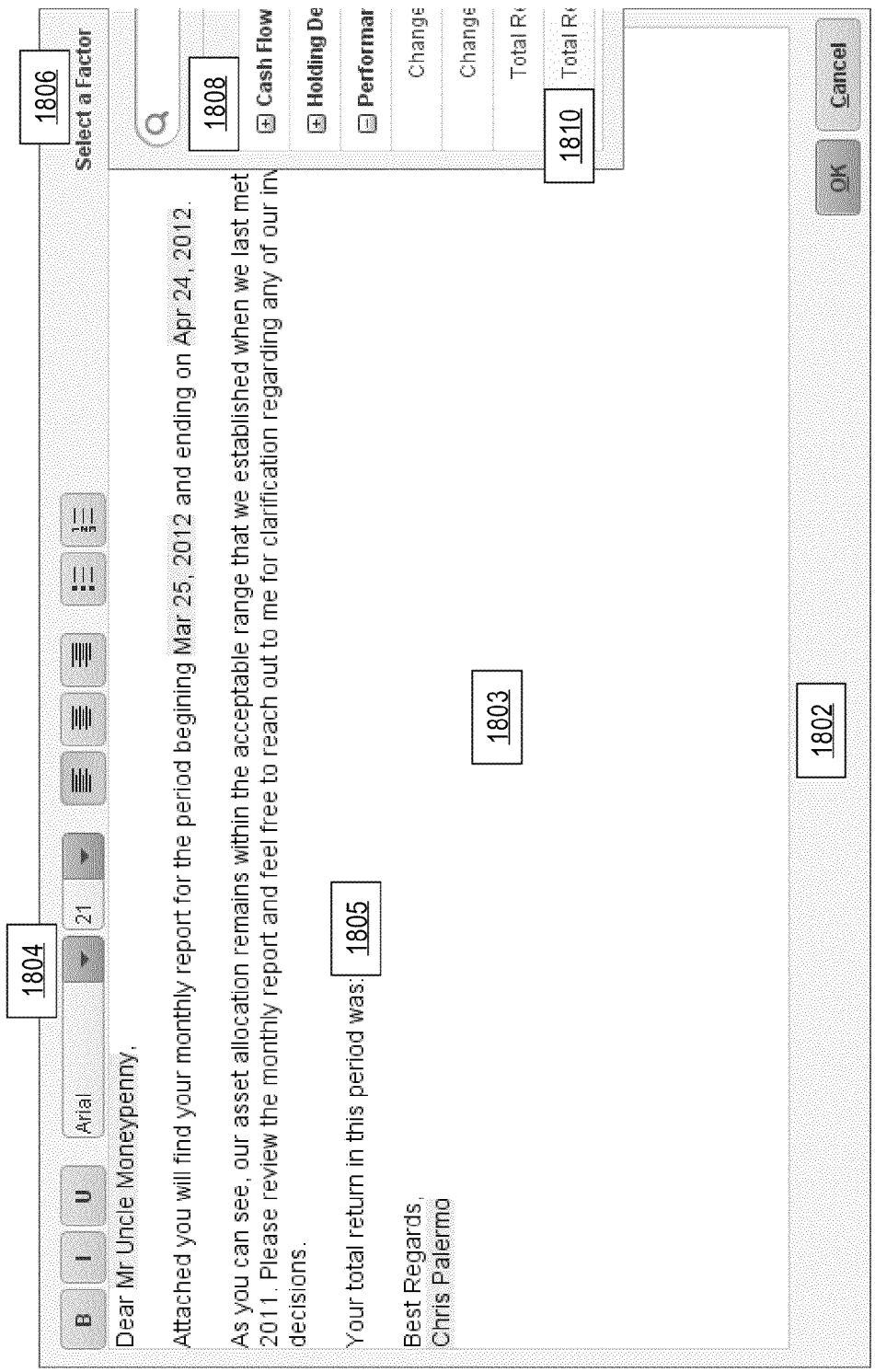
FIG. 18 illustrates an example text editing dialog.

Similar editing operations may be applied to text widgets and graph widgets. For example, context-sensitive operations for text widgets may include editing the text, changing text color, or deleting the widget. Further, in an embodiment, report unit 109 is configured to permit editing text with the capability to insert symbolic references to Factors that are substituted with specific values based on the Context when a report is displayed. In an embodiment, to insert symbolic references in text, a user selects a text widget, then selects an Edit Text control from the options panel 1530. In response, report unit 109 causes displaying a text editing dialog. FIG. 18 illustrates an example text editing dialog. In an embodiment, text editing dialog 1802 comprises formatting controls 1804 and a Factor selection link 1806 adjacent to a text display window 1803, which in the example of FIG. 18 displays previously entered example text. Assume that a user wants to insert a symbolic reference in the text at position 1805. After selecting that position, the user selects the Factor selection link 1806. In response, report unit 109 causes displaying a menu 1808 of available Factors, organized in a tree hierarchy in the same manner used in other Factor selection menus that have been previously described. The user may select any particular Factor 1810 from the menu. In response, report unit 109 causes inserting a symbolic reference at position 1805 and concurrently displays a specific value for the symbolic reference based on the current Context. Thereafter, if the Context is changed during display of the report, the specific value displayed at the same position 1805 automatically changes based on the current Context without separate editing or configuration by the user. Consequently, the user may prepare a report and re-display the report in different Contexts for the benefit of multiple different clients or legal entities, enabling the automatic generation of custom tailored reports that use appropriate client data based on the Context.

Operations for graph widgets may include changing the title of a graph or deleting the widget.

Consequently, a user can begin with a prior report and make any desired modifications to the content of the report without adversely affecting the formatting or appearance of the report, which maintains adherence to the underlying formatting guidelines that are associated with pages and widgets. In each case, filtering options and other changes that are selected in a report result only in aesthetic changes to the presentation of the report and do not result in changing underlying calculations or filtering of data.

In an embodiment, report unit 109 is configured to provide automatic page splitting in response to specified user input. Page splitting refers to automatically creating one or more copies of a particular report page based upon a specified splitting factor, such as asset class, country, or sector. With page splitting, a user can create a particular page arrangement once, and then automatically create copies of the particular page arrangement but with data divided according to the splitting factor. For example, if a client holds assets in United States, France, and Germany, a user can create a single page arrangement and then request page splitting by country; in response, report unit 109 creates two (2) additional pages and then distributes the data among the three (3) resulting pages so that only United States asset data appears on one page and asset data for France and Germany appear on other pages.

In an embodiment, the splitting factor may be any Factor that has been defined in the system. In an embodiment, to accomplish page splitting, a user selects a Split Page widget from the page options panel 1510. In response, report unit 109 causes displaying a menu of Factors, organized in a hierarchy or tree as previously described for other features. User input is received to select one of the Factors from the menu. In response, report unit 109 creates and stores metadata defining one or more other pages and associates the metadata with the current report, then causes re-computing and re-displaying the report based upon the splitting Factor and the newly created metadata. The new pages are reflected in the page outline 1506. As a result, the techniques herein provide for complete flexibility in defining reports and page groupings, and in particular, the availability of any Factor as a split factor imposes no restrictions on the ability to define page splits.

In an embodiment, the metadata for each split page is coupled by references to the first page of the report. Consequently, each split page inherits, through the references and based upon object inheritance mechanisms, any modifications that the user makes to the first page of the report. Further, in an embodiment, each split page is not capable of modification by the user, but instead receives re-rendered data in dependence on the first page and any changes made to that page.

Figure 19:
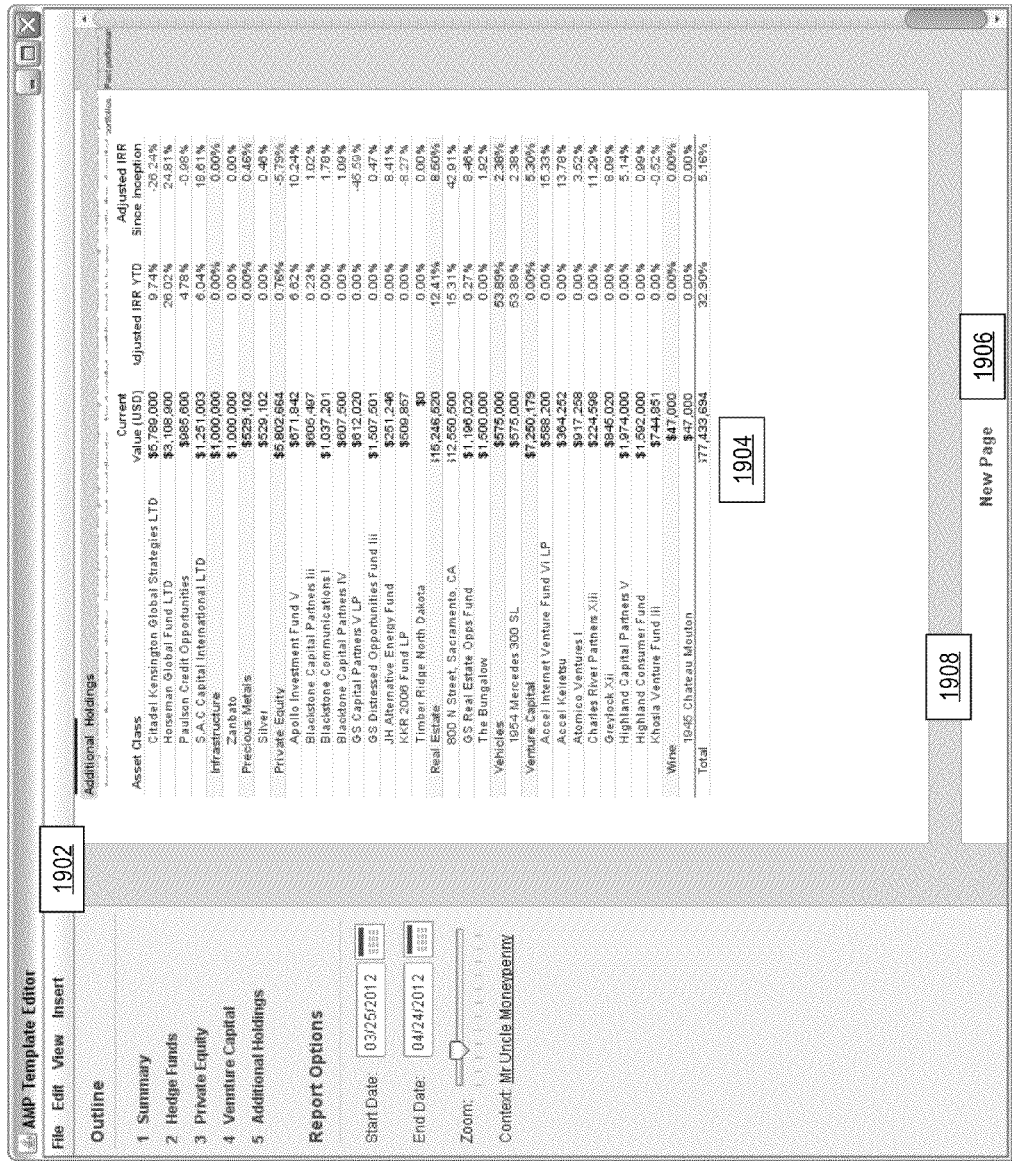
FIG. 19 illustrates an approach for adding new pages to a report.

FIG. 19 illustrates an approach for adding new pages to a report. In an embodiment, a report creation user interface 1902 may display a last page 1904 of a report, and a new page region 1906 adjacent to an end of the last page of the report. In an embodiment, pages of the report are displayed using a white background, and non-white coloring indicates borders and other regions of the report creation user interface 1902 that are not part of a page of a report. In an embodiment, new page region 1906 is separated from the last page 1904 by a gutter region 1908, and the new page region has a width equivalent to the width of the last page. In this arrangement, the new page region 1906 is configured with the appearance of a partial page or truncated page that appears after or following the last page 1904. Optionally, the new page region 1906 may have a descriptive label such as "New Page," or an icon, symbol, or hyperlink that suggests to the user that a new page could be created by selecting the new page region or a part thereof.

In an embodiment, user selection of new page region 1906 causes the page display unit 109 to add metadata defining a new page to the report and re-display the report showing the added new page. The new page region 1906 is redisplayed adjacent to the new page, again separated by gutter region 1908. In various embodiments, the new page may comprise a copy of the last page, or a page that is blank except for headers, footers, page numbers and other page-level attributes that are defined by page metadata or inherited from a preceding page. Using these techniques, the report creation user interface 1902 provides an efficient and attractive method to identify that the last page of a report has been reached and to suggest to the user a mechanism or method for creating a new page.

In an embodiment, upon completing the definition of a report using the reporting dialogs described herein, the report may be rendered in a static PDF file for communication to an external user or computer. In an embodiment, the static PDF file is rendered in a vectorized PDF format, enabling zoom-in to an arbitrary level of magnification without introducing jagged font edges or other artifacts of image transformation.

In an embodiment, report unit 109 is further configured to export or import one or more report templates in response to user selection of an export function or import function within the report interface. A report template is a set of metadata that defines the appearance of a report, including the metadata described above for the nature and form of widgets, the position of widgets in pages, the number of pages, symbolic references in text, certain static text, and references between split pages and a first page. However, a report template does not include any actual data values. Therefore, a report template may be shared and communicated across firms or using non-secure network links without compromising the privacy of actual data values. Importing a template involves reading the metadata values that comprise the template, building a memory model of the report, and rendering a display of the report based on the current Context. Actual data values are substituted into the report template and become visible only after importing is complete and computation of the report is performed using the graph traversal techniques described herein.

In an embodiment, report unit 109 is configured to permit publication of a report in electronic document form (for example, as a PDF file) to a plurality of individuals or legal entities. Publication enables transforming a particular report view into a plurality of fully rendered report files, each using data specific to one of the individuals or legal entities. Thus, using a batch publication operation, a user can generate custom reports for each of a plurality of clients, individuals or legal entities and containing only data associated with the recipient.

In an embodiment, a user may initiate publication by activating report unit 109 and selecting the menu options File→Export PDF. In response, report unit 109 causes displaying a pop-up menu that prompts the user to select a particular report and time range for data to be reflected in publications of the report. The user is also prompted to select one or more persons to be represented in one or more publications; the user may select one or more individuals, groups, or legal entities.

In an embodiment, as a particular individual, group or legal entity is selected in the prompt dialog, the report view (FIG. 15) is updated automatically in response to each selection using traversal of the graph 102 to yield data solely for the selected individual, group or legal entity. Consequently, the process of selecting targets for the publication enables the user to obtain a preview of the appearance of a publication of the report for that selected individual, group or legal entity. Further, while viewing the preview publication for a particular individual, group, or legal entity, the user may edit that individual publication to add a personal note or other customization just for one particular individual, group or legal entity.

In an embodiment, report unit 109 commences generating output for the publication in response to user input selecting a Publish widget. In an embodiment, the user can select publication by printing, generating a file, or emailing to a specified email account. In an embodiment, commencing publication causes report unit 109 to create a log entry in a log table of repository 104; this function enables an organization to monitor communication of sensitive financial data by creating an audit trail of which users communicated particular data to particular external destinations. A log entry may identify the current user, time, publication operation, destination (email, file, printer), publication identifier, etc.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
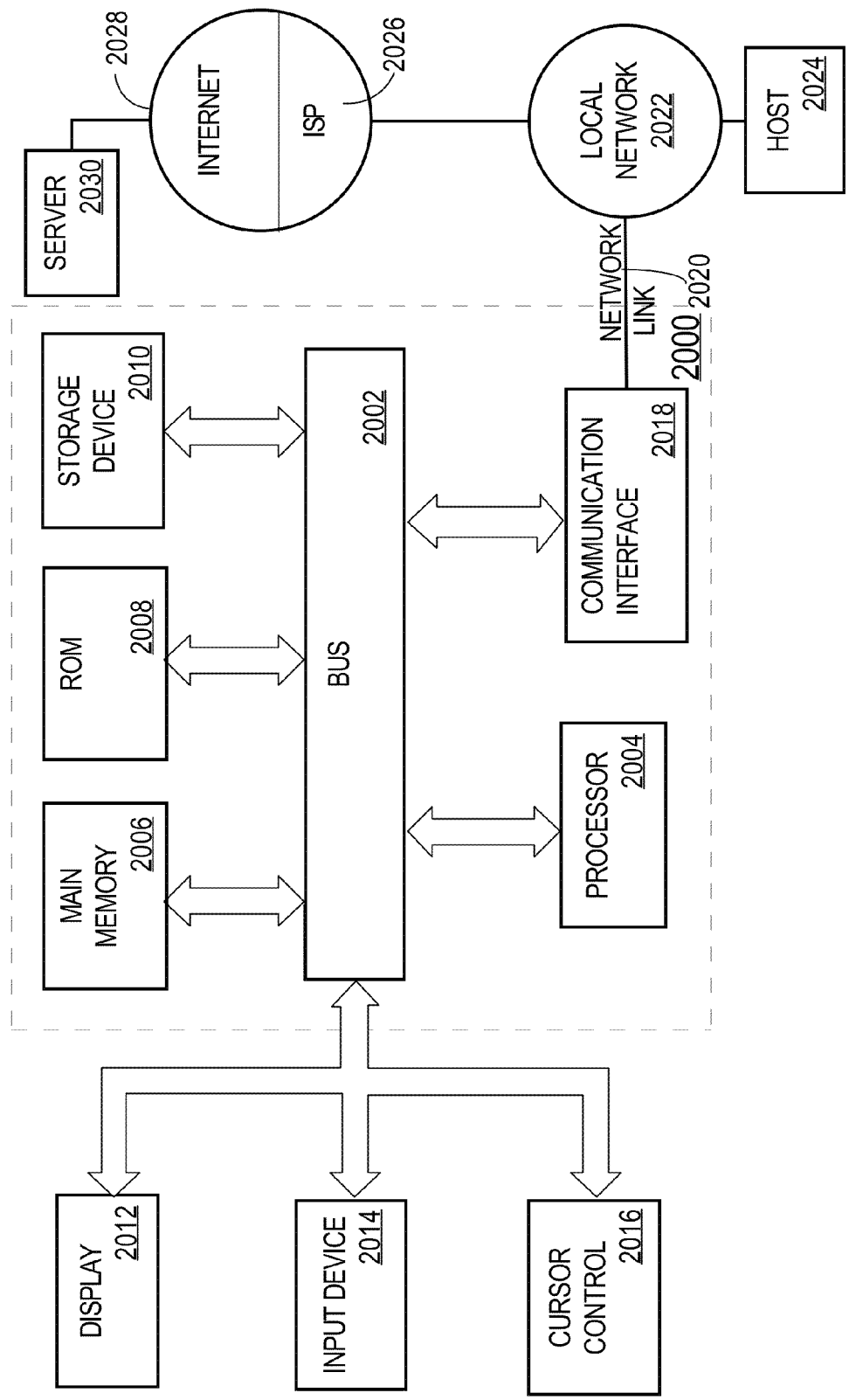
FIG. 20 illustrates a computer system with which an embodiment may be implemented.

For example, FIG. 20 is a block diagram that illustrates a computer system 2000 upon which an embodiment of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2010. Volatile media includes dynamic memory, such as main memory 2006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computing system configured to access one or more electronic data sources in response to inputs received via an interactive user interface in order to automatically calculate metrics based on a complex mathematical graph, insert the metrics into a dynamically generated table of the interactive user interface, and export the dynamically generated table to a portable format, the computing system comprising:

one or more electronic data sources storing a complex mathematical graph having nodes and edges, wherein:
   each of the nodes stores information associated with at least one of: a financial asset, an account in which a financial asset is held, an individual who owns a financial asset, or a legal entity that owns a financial asset, and
   each of the edges stores a relationship between two of the nodes, wherein a plurality of attributes is associated with each of the nodes and each of the edges;

a computer processor in communication with the one or more electronic data sources; and
   a non-transitory computer readable storage medium storing one or more computing units, each of the one or more computing units including program instructions configured for execution by the computer processor, the one or more computing units including:
   a report unit;
   a rendering unit configured to cause the computer processor to:
      generate interactive user interface data configured to be rendered on a computing device as an interactive user interface, the interactive user interface including:
         a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and
         a context selection element including a listing of a plurality of perspectives from which the dynamically generated table may be automatically updated, each of the plurality of perspectives associated with a node of the complex mathematical graph;
      configure the interactive user interface data such that the interactive user interface is configured to receive a selection of one of the plurality of perspectives; and
      configure the interactive user interface data such that the interactive user interface is configured to receive indications of one or more bucketing factors and one or more column factors; and
   a view computation unit in communication with the rendering unit and configured to cause the computer processor to:
      receive the selection of the one of the plurality of perspectives from the rendering unit;
      receive the indications of the one or more bucketing factors and the one or more column factors from the rendering unit;
      determine a node of the complex mathematical graph associated with the selected perspective;
      automatically traverse the complex mathematical graph from the determined node by:
         enumerating all paths within the complex mathematical graph that originate at the determined node, wherein each path comprises at least the determined node and an edge;
         if it is determined, during enumeration of the paths and for each path that is enumerated, that the path includes two identical and adjacent sequences of nodes and edges, moving to a next adjacent path; and
         creating a list of a plurality of paths of nodes and edges in the complex mathematical graph that are enumerated and associated with the determined node;
      for each of the plurality of paths, determine any rows of the dynamically generated table associated with the path based on nodes commonly associated with the path and a row of the dynamically generated table;
      generate, by applying the received one or more bucketing factors to the plurality of paths, a tree hierarchy comprising value nodes corresponding to the rows of the dynamically generated table and associated with the respective paths determined to be associated with the rows; and for each value node of the tree hierarchy and each of the received one or more column factors:

apply the column factor to each of the paths associated with the value node to calculate, for each of the paths, based on attributes associated with nodes and/or edges in the respective paths, one or more path values; and aggregate the path values associated with each of the value nodes to calculate a metric value corresponding to each combination of value node and column factor;

wherein the rendering unit is further configured to cause the computer processor to:

receive the calculated metric values from the view computation unit;

automatically update the dynamically generated table with the calculated metric values, wherein each of the calculated metric values is inserted into a cell of the table corresponding to the row associated with the value node associated with the calculated metric value and the column associated with the column factor associated with the calculated metric value; and insert the updated dynamically generated table into a report associated with the selected perspective;

wherein the report unit is configured to cause the computer processor to:

receive the report from the rendering unit; and export the report to an electronic document having a commonly used format.

2. The computing system of claim 1, wherein each of the edges represents at least one of an ownership, a containment, or a data flow.

3. The computing system of claim 1, wherein each of the one or more column factors comprises an executable code segment configured to perform one or more mathematical calculations to calculate the one or more path values.

4. The computing system of claim 1, wherein each of the one or more column factors comprises an executable code segment configured to invoke a function of a network resource using one or more attributes associated with nodes and/or edges.

5. The computing system of claim 1, wherein applying the column factor to each of the paths associated with the value node to calculate one or more path values comprises:

calculating an ownership percentage based on an ownership attribute associated with an edge.

6. The computing system of claim 1, wherein aggregating the path values associated with each of the value nodes comprises summing the path values.

7. The computing system of claim 1, wherein aggregating the path values associated with each of the value nodes comprises applying a mathematical calculation based on the column factor.

8. The computing system of claim 1, wherein the calculated metric values include at least one of an asset value, an internal rate of return, a time weighted rate of return, or another financial metric.

9. The computing system of claim 1, wherein the one or more bucketing factors include at least one of asset class or owner.

10. The computing system of claim 1, wherein:

the rendering unit is further configured to cause the computer processor to:

further configure the interactive user interface data such that the interactive user interface is configured to receive a selection of a second one of the plurality of perspectives; and the view computation unit is further configured to cause the computer processor to:

receive the selection of the second one of the plurality of perspectives from the rendering unit; and automatically:

determine a second node of the complex mathematical graph associated with the selected second perspective;

re-traverse the complex mathematical graph from the determined second node and re-create the list of a plurality of paths of nodes and edges in the complex mathematical graph that are associated with the determined second node; and re-calculate the metric values;

wherein the rendering unit is further configured to cause the computer processor to:

receive the re-calculated metric values from the view computation unit; and automatically update the dynamically generated table with the re-calculated metric values.

11. The computing system of claim 1, wherein:

the rendering unit is further configured to cause the computer processor to:

further configure the interactive user interface data such that the interactive user interface is configured to receive indications of one or more other bucketing factors; and the view computation unit is further configured to cause the computer processor to:

receive the indications of the one or more other bucketing factors from the rendering unit; and automatically:

re-generate, by applying the received one or more other bucketing factors to the plurality of paths, the tree hierarchy comprising value nodes corresponding to the rows of the dynamically generated table and associated with the respective paths determined to be associated with the rows; and re-calculate the metric values;

wherein the rendering unit is further configured to cause the computer processor to:

receive the re-calculated metric values from the view computation unit; and automatically update the dynamically generated table with the re-calculated metric values.

12. The computing system of claim 1, wherein:

the rendering unit is further configured to cause the computer processor to:

further configure the interactive user interface data such that the interactive user interface is configured to receive indications of one or more other column factors; and the view computation unit is further configured to cause the computer processor to:

receive the indications of the one or more other column factors from the rendering unit; and automatically:

for each value node of the tree hierarchy and each of the received one or more other column factors:

apply the other column factor to each of the paths associated with the value node to re-calculate, for each of the paths, based on attributes associated with nodes and/or edges, the one or more path values; and re-aggregate the path values associated with each of the value nodes to re-calculate the metric value corresponding to each combination of value node and other column factor;

wherein the rendering unit is further configured to cause the computer processor to:

receive the re-calculated metric values from the view computation unit; and automatically update the dynamically generated table with the re-calculated metric values.

13. The computing system of claim 1, wherein the complex mathematical graph comprises a non-displayed graph.

14. The computing system of claim 1, wherein the rendering unit is further configured to cause the computer processor to:

display the updated dynamically generated table in at least one page of a plurality of pages in the report, wherein the report comprises the plurality of pages report metadata.

15. The computing system of claim 1, wherein the report unit is further configured to cause the computer processor to:

receive the calculated metric values from the view computation unit;

display the calculated metric values in a plurality of widgets in one or more pages of the report, wherein the calculated metric values in a particular widget in the plurality of widgets is displayed in a widget format described by widget formatting attributes of the particular widget, wherein the widget formatting attributes are controlled by a plurality of widget controls;

displaying the plurality of widget controls for the particular widget;

receiving a modification to a widget control of the plurality of widget controls;

in response to receiving the modification, modifying the widget formatting attributes of the particular widget;

causing re-displaying the calculated metric values in the particular widget in a different format described by the modified widget formatting attributes of the particular widget.

16. A computer-implemented method of accessing one or more electronic data sources in response to inputs received via an interactive user interface in order to automatically calculate metrics based on a complex mathematical graph, insert the metrics into a dynamically generated table of the interactive user interface, and export the dynamically generated table to a portable format, the computer-implemented method comprising:

storing, on one or more electronic data sources, a complex mathematical graph having nodes and edges, wherein:

each of the nodes stores information associated with at least one of: a financial asset, an account in which a financial asset is held, an individual who owns a financial asset, or a legal entity that owns a financial asset, and each of the edges stores a relationship between two of the nodes, wherein a plurality of attributes is associated with each of the nodes and each of the edges;

executing, by a computer processor in communication with the one or more electronic data sources, one or more computing units stored on a non-transitory computer readable storage medium, each of the one or more computing units including program instructions configured for execution by the computer processor, the one or more computing units including:

a report unit;

a rendering unit configured to cause the computer processor to:

generate interactive user interface data configured to be rendered on a computing device as an interactive user interface, the interactive user interface including:

a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and a context selection element including a listing of a plurality of perspectives from which the dynamically generated table may be automatically updated, each of the plurality of perspectives associated with a node of the complex mathematical graph;

configure the interactive user interface data such that the interactive user interface is configured to receive a selection of one of the plurality of perspectives; and configure the interactive user interface data such that the interactive user interface is configured to receive indications of one or more bucketing factors and one or more column factors; and a view computation unit in communication with the rendering unit and configured to cause the computer processor to:

receive the selection of the one of the plurality of perspectives from the rendering unit;

receive the indications of the one or more bucketing factors and the one or more column factors from the rendering unit;

determine a node of the complex mathematical graph associated with the selected perspective;

automatically traverse the complex mathematical graph from the determined node by:

enumerating all paths within the complex mathematical graph that originate at the determined node, wherein each path comprises at least the determined node and an edge;

if it is determined, during enumeration of the paths and for each path that is enumerated, that the path includes two identical and adjacent sequences of nodes and edges, moving to a next adjacent path; and creating a list of a plurality of paths of nodes and edges in the complex mathematical graph that are enumerated and associated with the determined node;

for each of the plurality of paths, determine any rows of the dynamically generated table associated with the path based on nodes commonly associated with the path and a row of the dynamically generated table;

generate, by applying the received one or more bucketing factors to the plurality of paths, a tree hierarchy comprising value nodes corresponding to the rows of the dynamically generated table and associated with the respective paths determined to be associated with the rows; and for each value node of the tree hierarchy and each of the received one or more column factors:

apply the column factor to each of the paths associated with the value node to calculate, for each of the paths, based on attributes associated with nodes and/or edges in the respective paths, one or more path values; and aggregate the path values associated with each of the value nodes to calculate a metric value corresponding to each combination of value node and column factor;

wherein the rendering unit is further configured to cause the computer processor to:
receive the calculated metric values from the view computation unit;
automatically update the dynamically generated table with the calculated metric values, wherein each of the calculated metric values is inserted into a cell of the table corresponding to the row associated with the value node associated with the calculated metric value and the column associated with the column factor associated with the calculated metric value; and
insert the updated dynamically generated table into a report associated with the selected perspective;
wherein the report unit is configured to cause the computer processor to:
receive the report from the rendering unit; and
export the report to an electronic document having a commonly used format.

17. The computer-implemented method of claim 16, wherein:
the rendering unit is further configured to cause the computer processor to:
further configure the interactive user interface data such that the interactive user interface is configured to receive a selection of a second one of the plurality of perspectives; and
the view computation unit is further configured to cause the computer processor to:
receive the selection of the second one of the plurality of perspectives from the rendering unit; and
automatically:
determine a second node of the complex mathematical graph associated with the selected second perspective;
re-traverse the complex mathematical graph from the determined second node and re-create the list of a plurality of paths of nodes and edges in the complex mathematical graph that are associated with the determined second node; and
re-calculate the metric values;
wherein the rendering unit is further configured to cause the computer processor to:
receive the re-calculated metric values from the view computation unit; and
automatically update the dynamically generated table with the re-calculated metric values.

18. A non-transitory computer readable storage medium storing one or more computing units, each of the one or more computing units including program instructions configured for execution by a computer processor, the one or more computing units configured to cause the computer processor to access one or more electronic data sources in response to inputs received via an interactive user interface in order to automatically calculate metrics based on a complex mathematical graph, insert the metrics into a dynamically generated table of the interactive user interface, and export the dynamically generated table to a portable format, the computer processor in communication with the one or more electronic data sources, wherein:
the one or more electronic data sources store a complex mathematical graph having nodes and edges, wherein:
each of the nodes stores information associated with at least one of: a financial asset, an account in which a financial asset is held, an individual who owns a financial asset, or a legal entity that owns a financial asset, and
each of the edges stores a relationship between two of the nodes, wherein a plurality of attributes is associated with each of the nodes and each of the edges; and the one or more computing units include:
a report unit;
a rendering unit configured to cause the computer processor to:
generate interactive user interface data configured to be rendered on a computing device as an interactive user interface, the interactive user interface including:
a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and
a context selection element including a listing of a plurality of perspectives from which the dynamically generated table may be automatically updated, each of the plurality of perspectives associated with a node of the complex mathematical graph;
configure the interactive user interface data such that the interactive user interface is configured to receive a selection of one of the plurality of perspectives; and
configure the interactive user interface data such that the interactive user interface is configured to receive indications of one or more bucketing factors and one or more column factors; and
a view computation unit in communication with the rendering unit and configured to cause the computer processor to:
receive the selection of the one of the plurality of perspectives from the rendering unit;
receive the indications of the one or more bucketing factors and the one or more column factors from the rendering unit;
determine a node of the complex mathematical graph associated with the selected perspective;
automatically traverse the complex mathematical graph from the determined node by:
enumerating all paths within the complex mathematical graph that originate at the determined node, wherein each path comprises at least the determined node and an edge;
if it is determined, during enumeration of the paths and for each path that is enumerated, that the path includes two identical and adjacent sequences of nodes and edges, moving to a next adjacent path; and
creating a list of a plurality of paths of nodes and edges in the complex mathematical graph that are enumerated and associated with the determined node;
for each of the plurality of paths, determine any rows of the dynamically generated table associated with the path based on nodes commonly associated with the path and a row of the dynamically generated table;
generate, by applying the received one or more bucketing factors to the plurality of paths, a tree hierarchy comprising value nodes corresponding to the rows of the dynamically generated table and associated with the respective paths determined to be associated with the rows; and
for each value node of the tree hierarchy and each of the received one or more column factors:
apply the column factor to each of the paths associated with the value node to calculate, for each of the paths, based on attributes associated with nodes and/or edges in the respective paths, one or more path values; and aggregate the path values associated with each of the value nodes to calculate a metric value corresponding to each combination of value node and column factor;

wherein the rendering unit is further configured to cause the computer processor to:

receive the calculated metric values from the view computation unit;

automatically update the dynamically generated table with the calculated metric values, wherein each of the calculated metric values is inserted into a cell of the table corresponding to the row associated with the value node associated with the calculated metric value and the column associated with the column factor associated with the calculated metric value; and insert the updated dynamically generated table into a report associated with the selected perspective;

wherein the report unit is configured to cause the computer processor to:

receive the report from the rendering unit; and export the report to an electronic document having a commonly used format.

19. The non-transitory computer readable storage medium of claim 18, wherein:

the rendering unit is further configured to cause the computer processor to:

further configure the interactive user interface data such that the interactive user interface is configured to receive a selection of a second one of the plurality of perspectives; and the view computation unit is further configured to cause the computer processor to:

receive the selection of the second one of the plurality of perspectives from the rendering unit; and automatically:

determine a second node of the complex mathematical graph associated with the selected second perspective;

re-traverse the complex mathematical graph from the determined second node and re-create the list of a plurality of paths of nodes and edges in the complex mathematical graph that are associated with the determined second node; and re-calculate the metric values;

wherein the rendering unit is further configured to cause the computer processor to:

receive the re-calculated metric values from the view computation unit; and automatically update the dynamically generated table with the re-calculated metric values.

* * * * *